US010439893B2

(12) United States Patent
Kobayashi

(10) Patent No.: US 10,439,893 B2
(45) Date of Patent: Oct. 8, 2019

(54) INFORMATION SHARING SYSTEM

(71) Applicant: CANON KABUSHIKI KAISHA, Tokyo (JP)

(72) Inventor: Norihiko Kobayashi, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 220 days.

(21) Appl. No.: 15/249,843

(22) Filed: Aug. 29, 2016

(65) Prior Publication Data

US 2017/0070391 A1     Mar. 9, 2017

(30) Foreign Application Priority Data

Sep. 8, 2015 (JP) ................................. 2015-176966

(51) Int. Cl.
  G06F 15/177 (2006.01)
  H04L 12/24 (2006.01)
  H04L 29/08 (2006.01)

(52) U.S. Cl.
  CPC .............. H04L 41/22 (2013.01); *H04L 67/28* (2013.01); *H04L 67/34* (2013.01)

(58) Field of Classification Search
  None
  See application file for complete search history.

(56) References Cited

U.S. PATENT DOCUMENTS

| 5,742,905 A * | 4/1998 | Pepe | H04L 29/06027 379/211.01 |
| 2001/0026608 A1* | 10/2001 | Beyda | H04M 1/65 379/88.13 |
| 2006/0294190 A1* | 12/2006 | Clarke | H04L 51/24 709/206 |
| 2009/0007143 A1* | 1/2009 | Chang | G06Q 10/107 719/318 |
| 2013/0218820 A1* | 8/2013 | Li | H04M 1/274516 706/20 |

(Continued)

FOREIGN PATENT DOCUMENTS

| JP | 2004-086800 A | 3/2004 |
| JP | 2006157922 A | 6/2006 |

(Continued)

OTHER PUBLICATIONS

Japanese Office Action issued in corresponding Japanese Application No. 2015176966 dated Jun. 28, 2019.

*Primary Examiner* — Umar Cheema
*Assistant Examiner* — Gregory P Tolchinsky
(74) *Attorney, Agent, or Firm* — Venable LLP

(57) ABSTRACT

A device capable of communicating with a server includes a first holding unit configured to hold setting information about a predetermined setting item. The server includes a second holding unit configured to hold setting information about the predetermined setting item. The updated contents of the setting information about the predetermined setting item held by the first holding unit are received and reflected on the setting information about the predetermined setting item held by the second holding unit. The upper limit of the information amount of the setting information for the predetermined setting item that the second holding unit can hold is larger than the upper limit of the information amount of the setting information for the predetermined setting item that the first holding unit can hold.

13 Claims, 18 Drawing Sheets

(56) References Cited

U.S. PATENT DOCUMENTS

2014/0228047 A1* 8/2014 Previtali ............... H04W 8/12
                                                          455/456.1
2016/0308782 A1* 10/2016 Devasthali ........... G06F 16/219

FOREIGN PATENT DOCUMENTS

| JP | 2011192120 A | 9/2011 |
|---|---|---|
| JP | 2012-123573 A | 6/2012 |

* cited by examiner

FIG. 5A

| GROUP NAME | APPLICATION NAME | ADDRESS BOOK NAME | DESTINATION INDEX | SETTING VALUE |
|---|---|---|---|---|
| Group1 | Send | AddressBook01 | 1 | aaa@.co.jp |
| Group1 | Send | AddressBook01 | 2 | bbbbb |
| Group1 | Send | AddressBook01 | 3 | ccccc |
| Group1 | Send | AddressBook01 | 4 | ddddd |
| Group1 | Send | AddressBook02 | 1 | eeeee |
| | | • | | |
| | | • | | |
| | | • | | |
| Group1 | Send | AddressBook02 | 198 | fffff |
| Group1 | Send | AddressBook02 | 199 | ggggg |
| | | | | |

FIG. 5B

| GROUP NAME | APPLICATION NAME | ADDRESS BOOK NAME | DESTINATION INDEX | SETTING VALUE |
|---|---|---|---|---|
| Group1 | Send | AddressBook01 | 1 | aaaaa |
| Group1 | Send | AddressBook01 | 2 | bbbbb |
| Group1 | Send | AddressBook01 | 3 | ccccc |
| Group1 | Send | AddressBook01 | 4 | ddddd |
| Group1 | Send | AddressBook02 | 1 | eeeee |
| | | • | | |
| | | • | | |
| | | • | | |
| Group1 | Send | AddressBook02 | 198 | fffff |
| Group1 | Send | AddressBook02 | 199 | ggggg |
| Group1 | Send | AddressBook02 | 200 | hhhhh |
| | | | | |

FIG. 5C

| GROUP NAME | APPLICATION NAME | ADDRESS BOOK NAME | DESTINATION INDEX | SETTING VALUE |
|---|---|---|---|---|
| Group1 | Send | AddressBook01 | 1 | aaaaa |
| Group1 | Send | AddressBook01 | 2 | bbbbb |
| Group1 | Send | AddressBook01 | 3 | ccccc |
| Group1 | Send | AddressBook01 | 4 | ddddd |
| Group1 | Send | AddressBook02 | 1 | eeeee |
| | | ○ | | |
| | | ○ | | |
| | | ○ | | |
| Group1 | Send | AddressBook02 | 198 | fffff |
| Group1 | Send | AddressBook02 | 199 | ggggg |
| Group1 | Send | AddressBook02 | 200 | iiiii |
| | | | | |

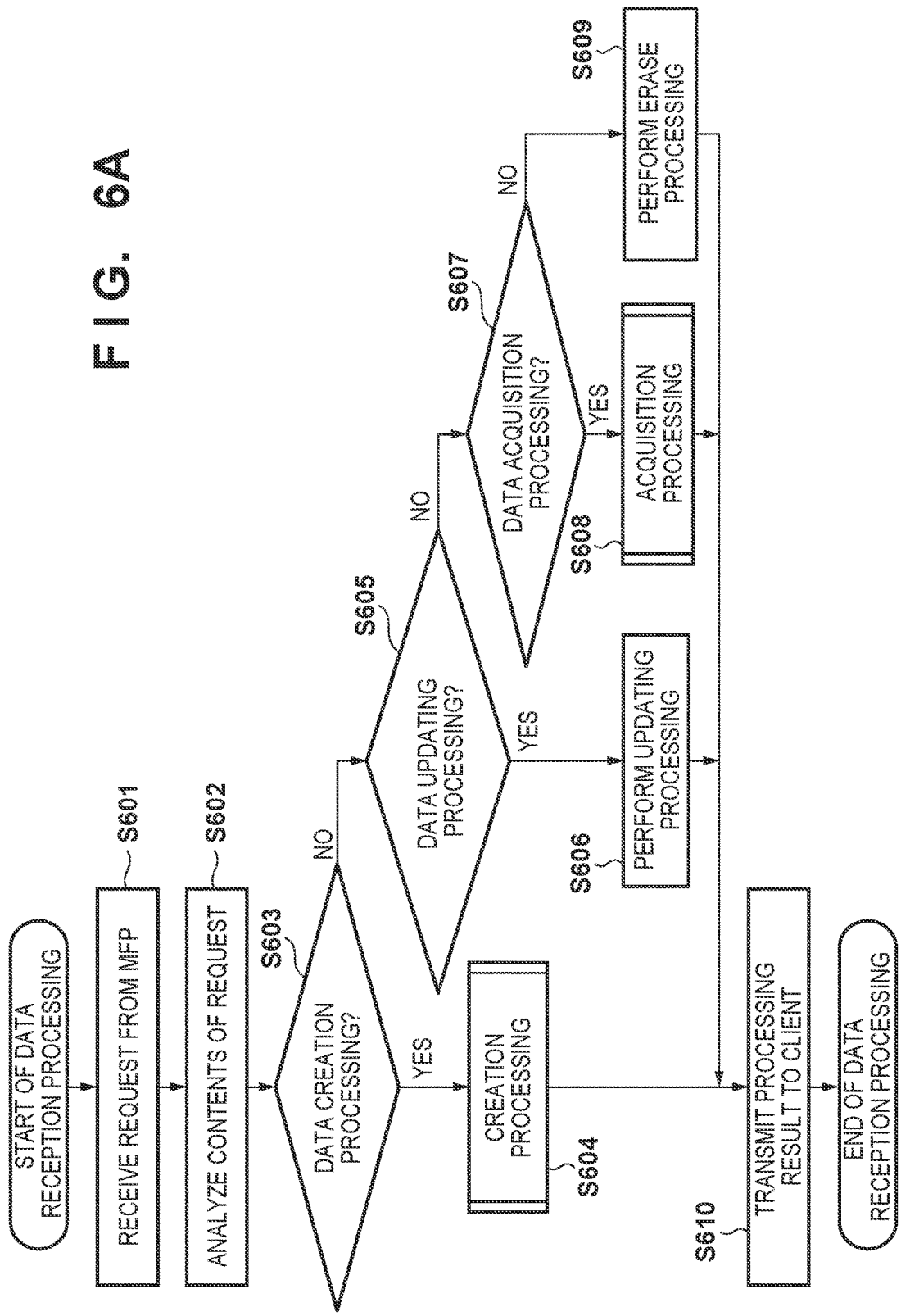

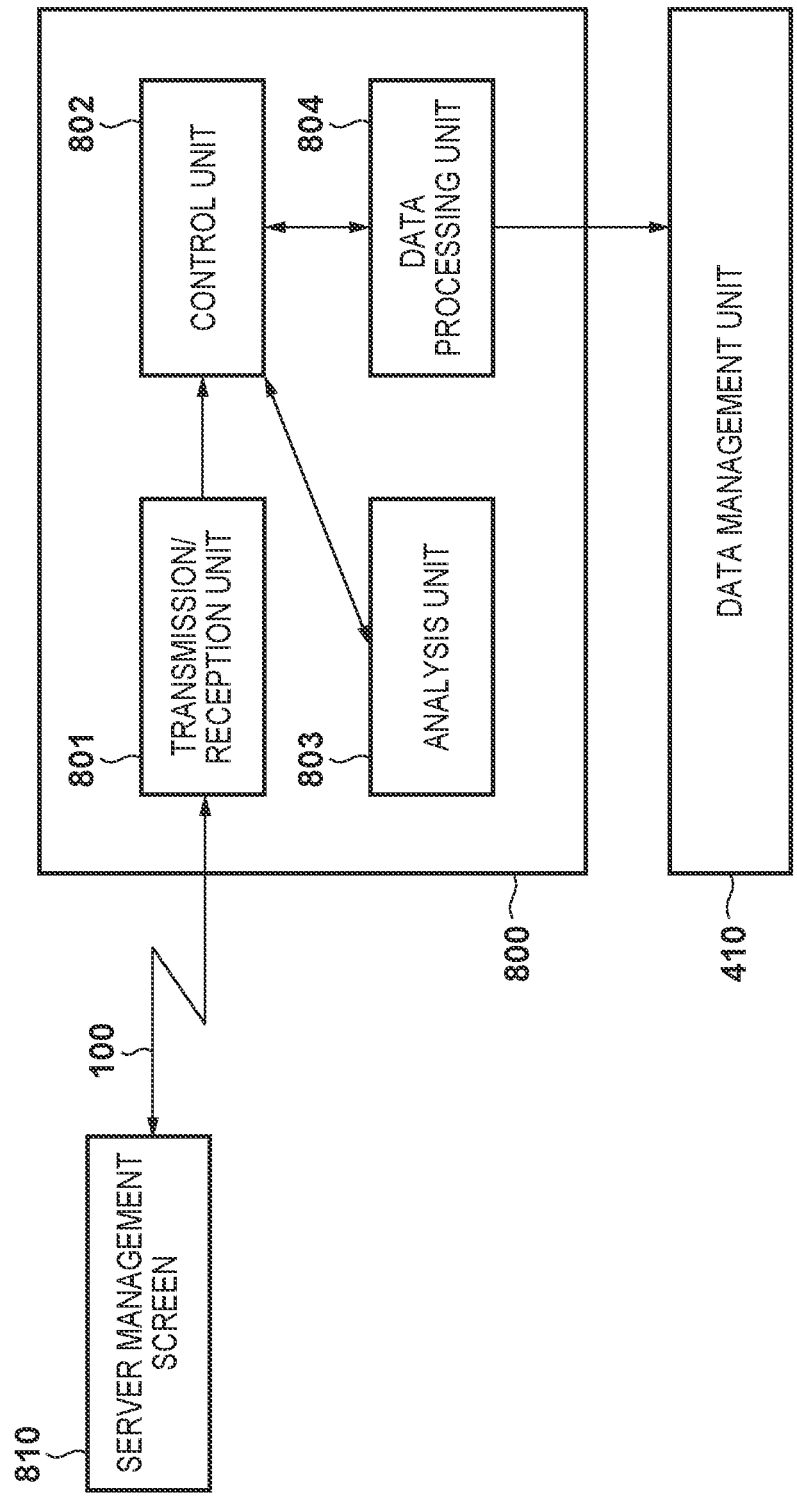

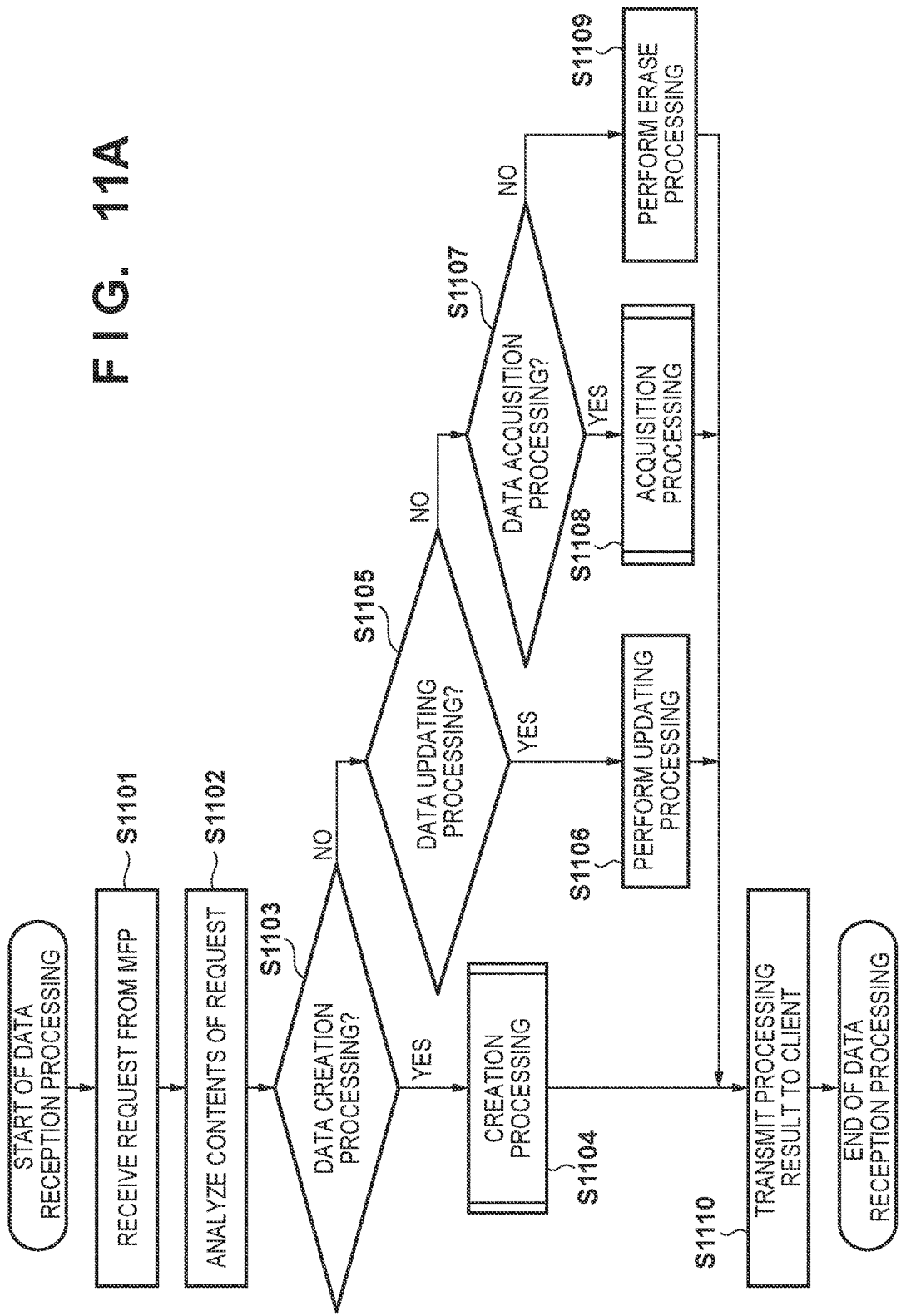

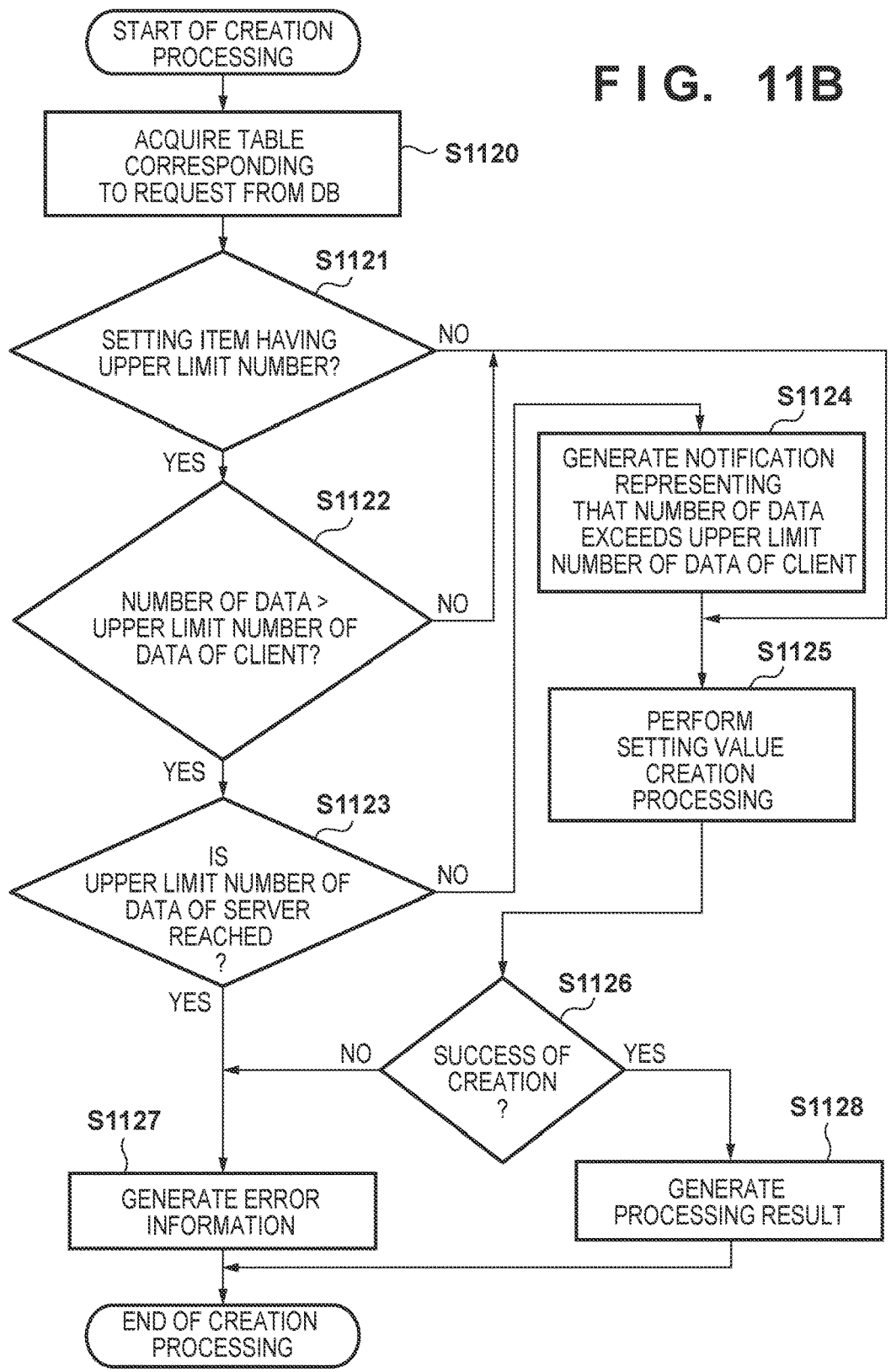

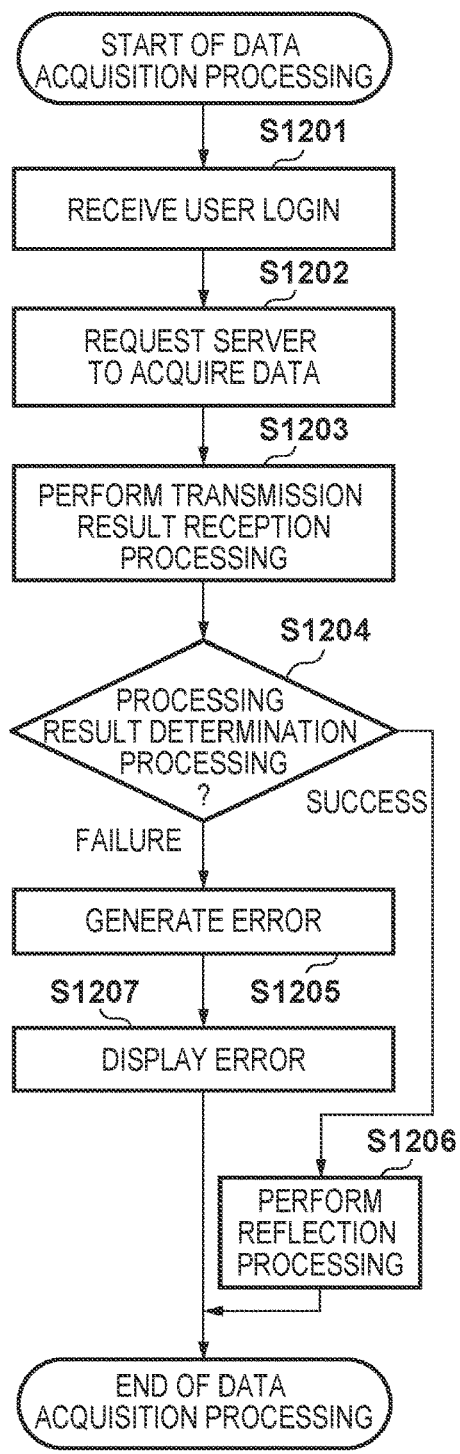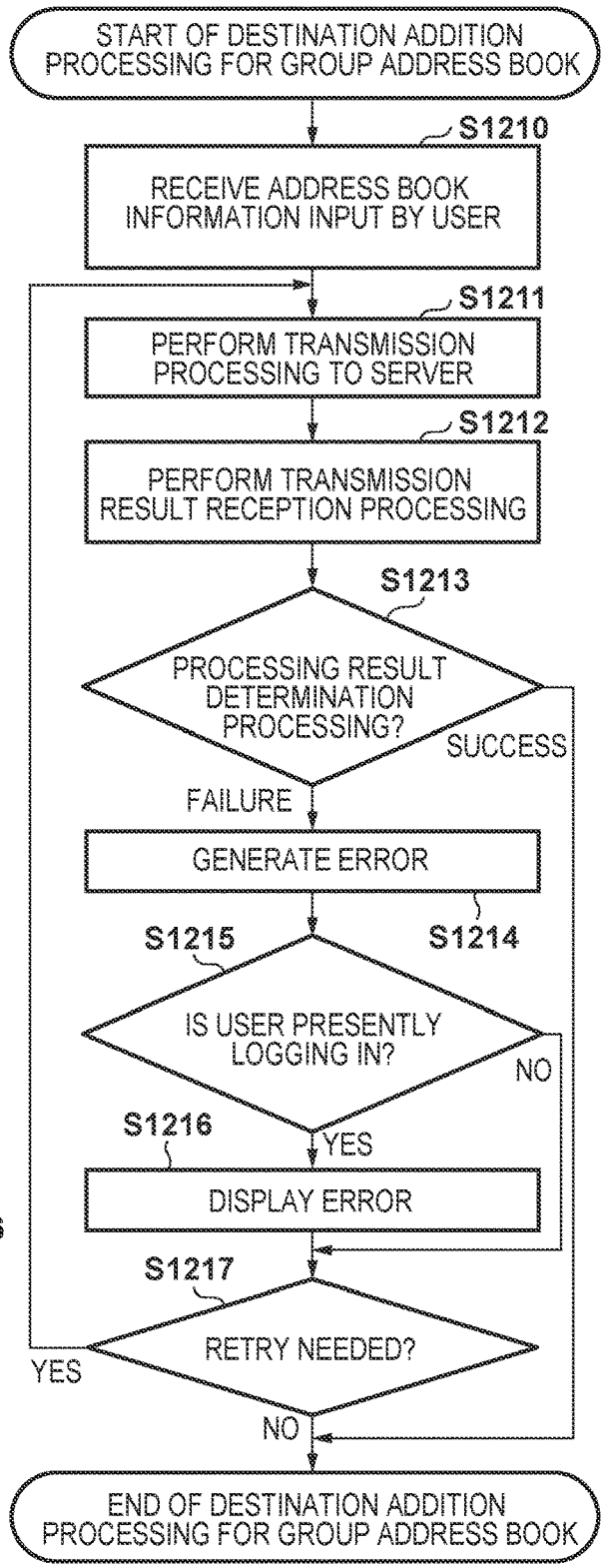

INFORMATION SHARING SYSTEM

BACKGROUND OF THE INVENTION

Field of the Invention

The present invention relates to an information sharing system for performing control to allow apparatuses to share information.

Description of the Related Art

There is conventionally known an information sharing system that causes a plurality of information processing apparatuses connected via a network to share common data.

Japanese Patent Laid-Open No. 2004-86800 describes a synchronization system that transmits, from a client to a server, data contents updated after previous data synchronization between the server and the client. Japanese Patent Laid-Open No. 2012-123573 describes a sharing system that causes a plurality of multifunction peripherals connected via a network to share user information.

In the system described in Japanese Patent Laid-Open No. 2004-86800, when the server and a plurality of clients share setting information, a setting change desired by the system administrator or the user of a client may not be reflected on the system.

For example, out of two clients that share information with a server, the first client communicates with the server. While the second client temporarily stops communication with the server, the first client that is communicating with the server adds user information of the local apparatus. The second client that has stopped the communication with the server also adds user information of the local apparatus.

In this case, in the system described in Japanese Patent Laid-Open No. 2004-86800, the first client notifies the server of the addition of the user information. The server adds the user information to be held in it in accordance with the notification from the first client. On the other hand, the second client cannot notify the server of the addition of the user information because of the stop of the communication with the server.

If the number of pieces of user information held in the server reaches the upper limit upon adding the user information according to the notification from the first client, the user information addition notification that is transmitted from the second client after resumption of the communication with the server is not reflected on the server.

The above-described problem occurs not only in the above example but also in a case in which the first and second clients communicate with the server and add user information at the same timing. That is, only addition of user information notified first is reflected on the server. Addition of the other piece of user information is not reflected on the server because the number of pieces of user information held in the server exceeds the upper limit.

The problem of the same contents described above concerning the system of Japanese Patent Laid-Open No. 2004-86800 arises even in a case in which one of the plurality of multifunction peripherals included in the information sharing system of Japanese Patent Laid-Open No. 2012-123573 is used as a server, and the remaining multifunction peripherals are used as clients. That is, even if the system administrator or the user of a client wants to reflect, on the server, addition of user information by the second client with priority over addition of user information by the first client, only the data change by the first client is reflected on the server.

In the above-described examples, the number of users of user information has an upper limit. However, the above-described problem may occur not only for the user information but also for any data other than user information used by the clients. The same problem as described above may arise even in a case in which not the number of data but the data capacity has an upper limit.

SUMMARY OF THE INVENTION

An aspect of the present invention is to eliminate the above-mentioned problems with the conventional technology. The present invention provides a mechanism configured to cause a server and a device serving as a client to appropriately share information.

The present invention in one aspect provides an information sharing system including a server and a device capable of communicating with the server, the device comprising: a first holding unit configured to hold setting information about a predetermined setting item used by the device, and the server comprising: a second holding unit configured to hold setting information about the predetermined setting item; and a reflecting unit configured to receive updated contents of the setting information about the predetermined setting item held by the first holding unit and reflect the updated contents on the setting information about the predetermined setting item held by the second holding unit, wherein an upper limit of an information amount of the setting information for the predetermined setting item that the second holding unit can hold is larger than an upper limit of an information amount of the setting information for the predetermined setting item that the first holding unit can hold.

According to the present invention, it is possible to cause a server and a device serving as a client to appropriately share information.

Further features of the present invention will become apparent from the following description of exemplary embodiments with reference to the attached drawings.

BRIEF DESCRIPTION OF THE DRAWINGS

FIGS. 5A to 5C are views showing group address books;

FIGS. 6A to 6C are flowcharts showing processing in the setting value management server at the time of request reception;

FIG. 8 is a block diagram of a server management application program;

FIGS. 11A and 11B are flowcharts showing processing in the setting value management server at the time of request reception;

FIGS. 12A and 12B are flowcharts showing the operation of the multifunction peripheral in a case in which the number of data exceeds the upper limit;

DESCRIPTION OF THE EMBODIMENTS

Figure 1:
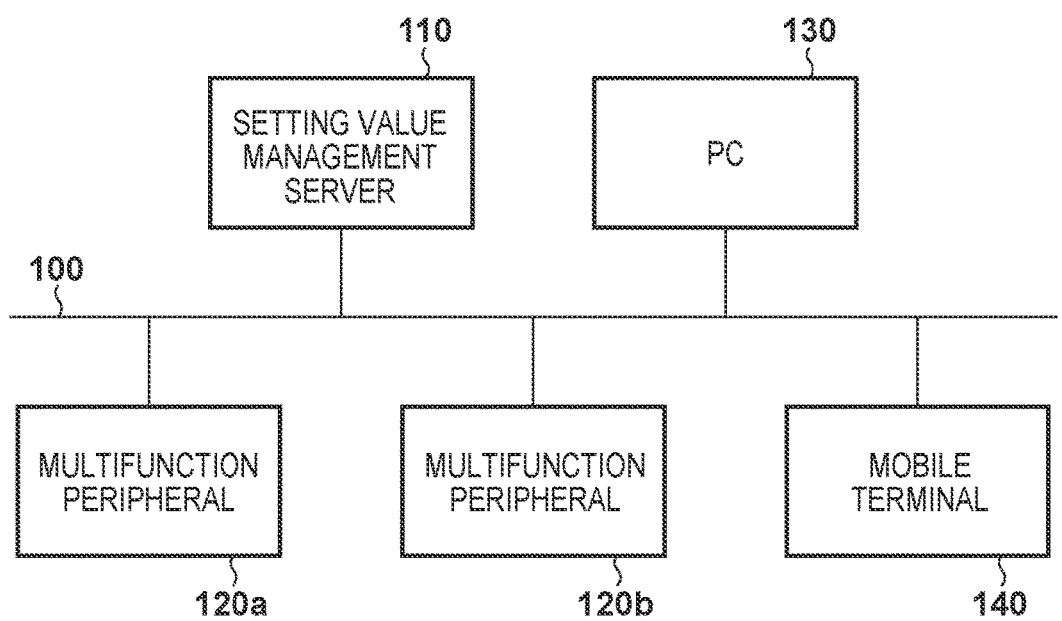
FIG. 1 is a block diagram showing an entire setting value synchronization system.

Preferred embodiments of the present invention will now be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention. Note that the same reference numerals denote the same constituent elements, and a description thereof will be omitted.

First Embodiment

FIG. 1 is a block diagram showing an entire setting value synchronization system. A setting value management server 110, a multifunction peripheral 120a, a multifunction peripheral 120b, a PC 130, and a mobile terminal 140 are connected to a network 100 so as to be communicable with each other.

The setting value management server 110 manages the master data of the setting values of the multifunction peripherals 120a and 120b. If the master data is changed, the setting value management server 110 notifies the multifunction peripherals 120a and 120b of the change information via the network 100 such as a LAN. Upon receiving the change information of a setting value from the multifunction peripheral 120a or 120b, the setting value management server 110 changes the value of the master data in itself. The multifunction peripherals 120a and 120b will sometimes be generically referred to as multifunction peripherals 120.

Each multifunction peripheral 120 is a device that implements a plurality of types of functions (copy, FAX, and the like), and internally stores user-specific setting values (user setting values) to be used when executing the functions. If a setting value is changed, the multifunction peripheral 120 notifies the setting value management server 110 of change information via the network 100. The change information is information representing the updated contents of the setting in the multifunction peripheral 120. Upon receiving the change information of master data of a setting value from the setting value management server 110, the multifunction peripheral 120 changes the value of the setting value in itself. The received change information is information representing the updated contents of the master data. If the master data on the setting value management server 110 is changed, both the multifunction peripherals 120a and 120b are notified of the change information of the setting value. If a setting value on one of the multifunction peripherals 120a and 120b is changed, the change information is first notified to the setting value management server 110 and then notified to the other multifunction peripheral as well via the setting value management server 110.

For example, if the user changes a setting value on the multifunction peripheral 120a, the multifunction peripheral 120a notifies the setting value management server 110 of the setting value change at the time of change. After that, if the user logs in to the multifunction peripheral 120b, the multifunction peripheral 120b requests the setting value management server 110 to acquire the setting values of the user.

Upon receiving the user setting value acquisition request, the setting value management server 110 extracts the setting values of the user on the master data and notifies them to the multifunction peripheral 120b. Upon receiving the notification, the multifunction peripheral 120b reflects the acquired setting values on local data managed by itself. Setting value synchronization is performed in this way.

When managing the setting value management server 110, management via a web application can also be performed by accessing the setting value management server from a web browser operating on the PC 130 or the mobile terminal 140. The arrangements of the setting value management server 110 and the multifunction peripherals 120 will be described later.

Figure 2:
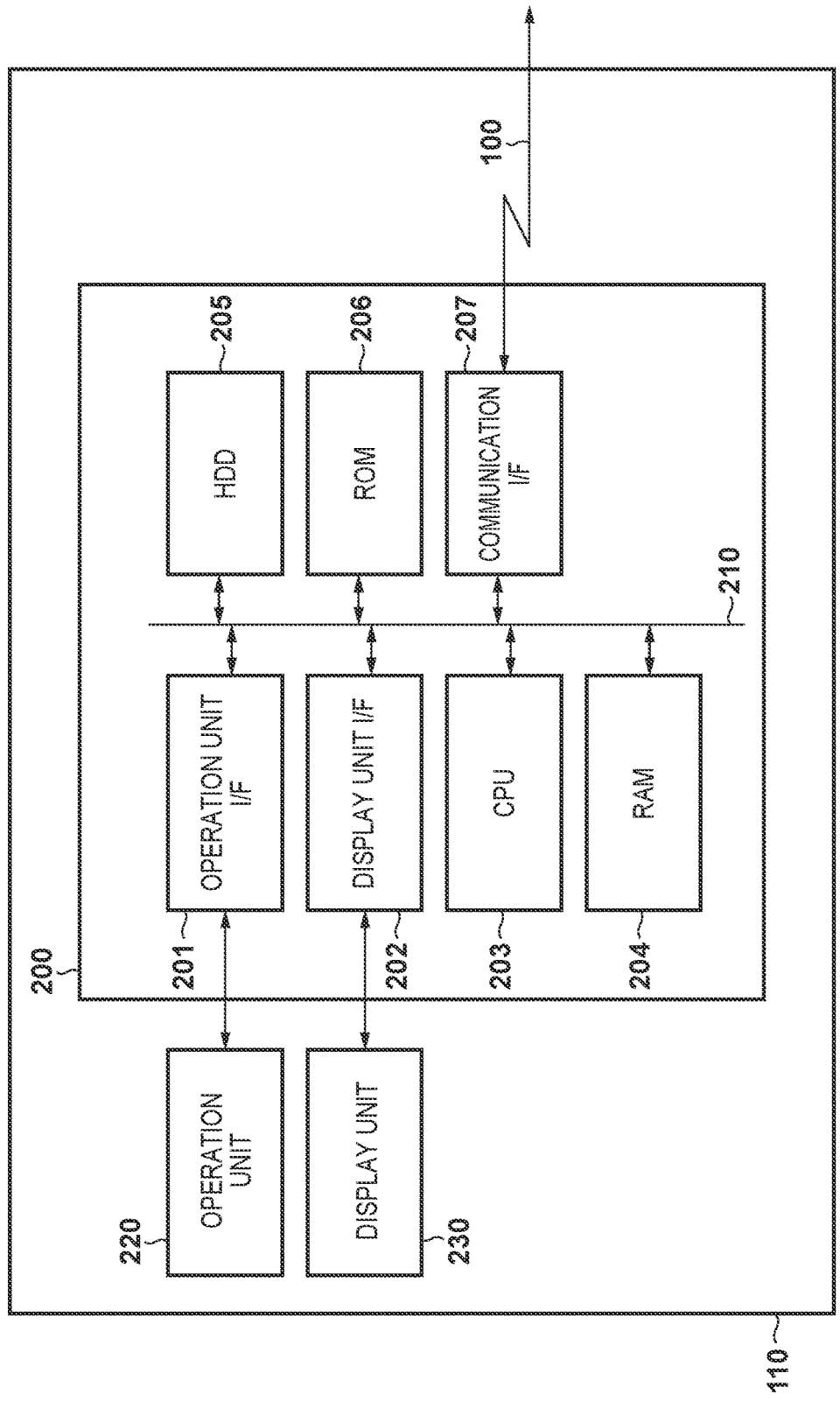
FIG. 2 is a block diagram showing the arrangement of a setting value management server.

FIG. 2 is a block diagram showing the arrangement of the setting value management server 110. The setting value management server 110 includes a controller unit 200, an operation unit 220, and a display unit 230. The controller unit 200 includes a CPU (Central Processing Unit) 203 that generally controls the apparatus. The CPU 203 activates an OS (Operating System) according to a boot program stored in a ROM (Read Only Memory) 206. On the OS, the CPU 203 executes an application program stored in an HDD (Hard Disk Drive) 205, thereby executing various kinds of processing. This embodiment is implemented by such an operation. A RAM (Random Access Memory) 204 is used as the work area of the CPU 203. The HDD 205 stores the application program and the master data of the setting values of the multifunction peripherals 120.

An operation unit interface (I/F) 201, a display unit I/F 202, and a communication I/F 207 are connected to the CPU 203 via a system bus 210, in addition to the ROM 206 and the RAM 204. The operation unit I/F 201 is an interface to the operation unit 220 formed from a pointing device, a keyboard, or the like, and outputs operation information input by the user via the operation unit 220 to the CPU 203. The display unit I/F 202 outputs, to the display unit 230, image data to be displayed on the display unit 230 formed from a display device or the like. The communication I/F 207 is connected to the network 100, and inputs/outputs information via the network 100 to/from each apparatus on the network 100.

Figure 3:
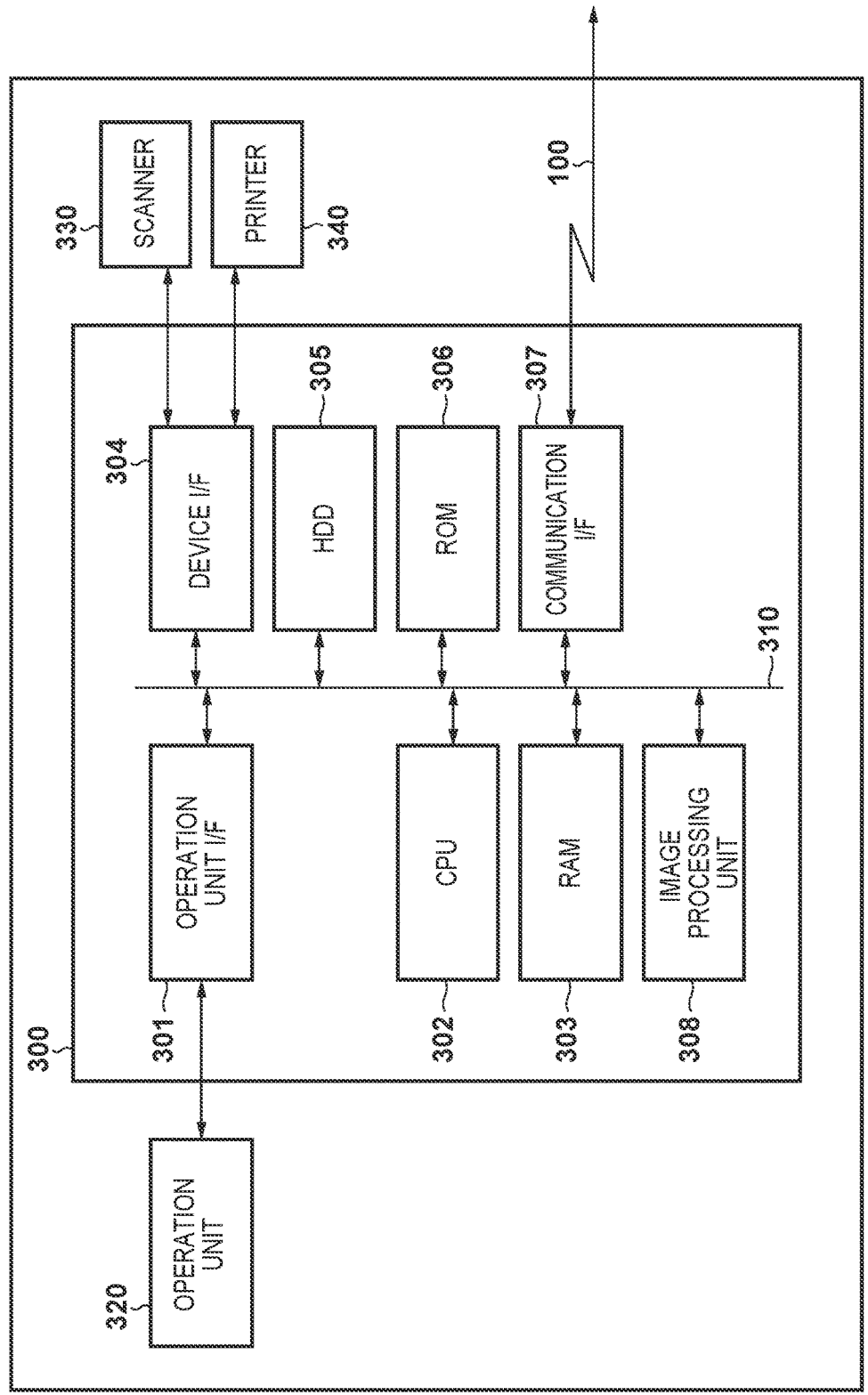
FIG. 3 is a block diagram showing the arrangement of a multifunction peripheral.

FIG. 3 is a block diagram showing the arrangement of the multifunction peripheral 120. The multifunction peripheral 120 includes a controller unit 300, an operation unit 320, a scanner 330, and a printer 340. The controller unit 300 is connected to the operation unit 320 and is also connected to the scanner 330 serving as an image input device and the printer 340 serving as an image output device.

The controller unit 300 includes a CPU 302 that generally controls the apparatus. The CPU 302 activates an OS according to a boot program stored in a ROM 306. On the OS, the CPU 302 executes an application program stored in an HDD 305, thereby executing various kinds of processing. This embodiment is also implemented by such an operation. A RAM 303 is used as the work area of the CPU 302. The RAM 303 provides, in addition to the work area, an image memory area for temporarily storing image data. The HDD 305 stores the above-described application programs, image data, and various kinds of setting values. A setting value management method in the multifunctional peripheral 120 will be described later.

An operation unit I/F 301, a device I/F 304, a communication I/F 307, and an image processing unit 308 are connected to the CPU 302 via a system bus 310, in addition to the ROM 306 and the RAM 303. The operation unit I/F 301 is an interface to the operation unit 320 having a touch panel, and outputs, to the operation unit 320, image data to be displayed on the operation unit 320. The operation unit I/F 301 also outputs operation information input by the user via the operation unit 320 to the CPU 302. The device I/F 304 is connected to the scanner 330 and the printer 340 and performs image data conversion between a synchronous system and an asynchronous system. The communication I/F 307 is connected to the network 100, and inputs/outputs information via the network 100 to/from each apparatus on the network 100. The image processing unit 308 performs processes such as processing of an input image to the scanner, processing of an output image to the printer, image rotation, image compression, resolution conversion, color space conversion, and tone conversion.

Figure 4:
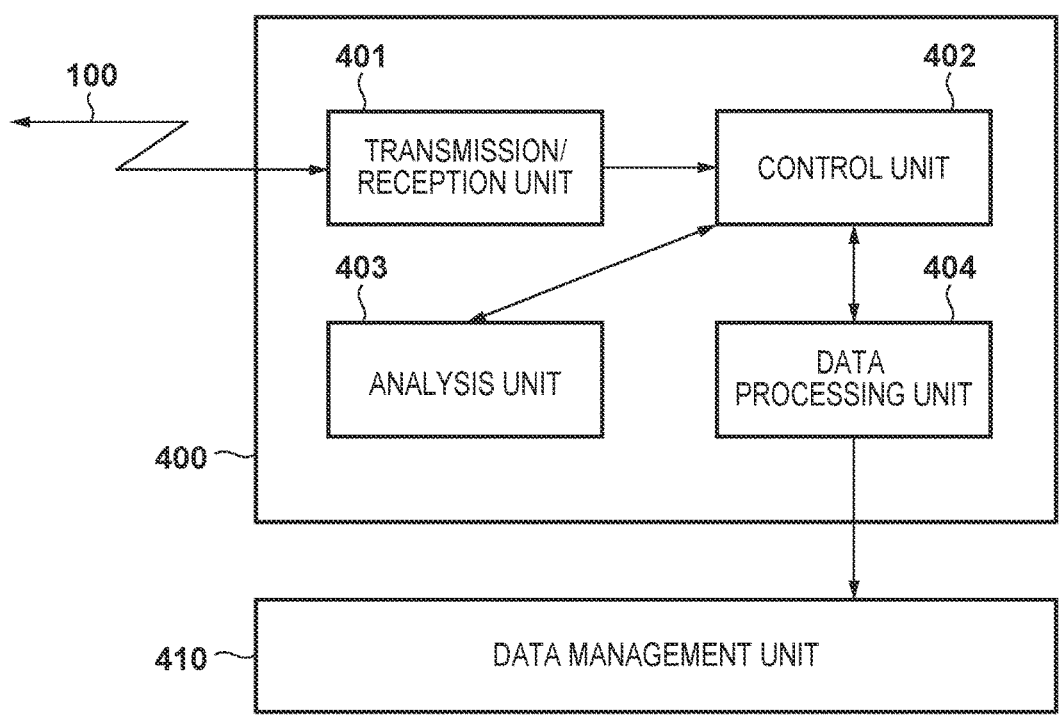
FIG. 4 is a block diagram of a data management application program.

FIG. 4 is a block diagram of a data management application 400 that operates on the setting value management server 110 and implements a data management function. The data management application 400 includes the following components. A transmission/reception unit 401 receives a processing request from the multifunction peripheral 120 via the network 100, or transmits a processing result to the multifunction peripheral 120. A control unit 402 controls each component of the data management application 400. An analysis unit 403 analyzes the request received by the transmission/reception unit 401. A data processing unit 404 accesses a data management unit 410 in accordance with the processing request received by the transmission/reception unit 401, and executes data creation, updating, deletion, and reference. Information managed by the data management unit 410 is saved in the HDD 205 or the RAM 204. The data management application 400 is stored in a storage unit out of the RAM 204, the HDD 205, and the ROM 206, and executed by the CPU 203.

The data management application 400 manages "device basic data", "device specification data", and "device setting data" out of setting data of the multifunction peripheral 120 as data concerning a device. The data management application 400 also manages "personalize data" and "one-touch address book data" as data concerning a user who uses a device or a user. The data management application 400 also manages "general address book data", "administrator address book data", "group address book data", and "user information data" as data concerning a user who uses a device or a user.

"Personalize data" are data such as a display language and a shortcut button that the user who uses the multifunction peripheral 120 registers as data for himself/herself. "Device basic data" are data concerning device information such as the device identification number and the version of the multifunction peripheral 120. "Device specification data" are data concerning the operation specifications of the device such as the presence/absence of correspondence of various kinds of setting values of the multifunction peripheral 120 and a supported range. "Device setting data" are data concerning the settings of the device such as network setting values of the multifunction peripheral 120 and setting values associated with a printer operation.

"One-touch address book data" is the address data of a one-touch address used in the multifunction peripheral 120. "General address book data" is the address data of an address book used by a general user in the multifunction peripheral 120. "Administrator address book data" is the address data of an address book dedicated to the administrator and used in the multifunction peripheral 120. "Group address book data" is the address data of an address book shared by a group including a plurality of users registered in the multifunction peripheral 120. "User information data" is information about a user who can use the multifunction peripheral 120.

The data management application 400 has a function of deciding the upper limit of each list format data such as "group address book data" whose number of data is changeable out of these setting data. Here, the upper limit means the upper limit number of data held in the multifunction peripheral 120 or the upper limit of the capacity of each data (the storage capacity that the storage unit of the multifunction peripheral 120 can hold for the data).

FIG. 5A is a view showing an example of group address book data managed by the data management unit 410 of the setting value management server 110 and stored in the HDD 205. A group name used to identify a group, the name of an address book, a destination index representing an ordinal number in the address book, and a setting value representing a destination are saved in the group address book data. For example, the second row in FIG. 5A indicates that the group name is Group1, the destination is the first destination in the first address book of the group address book, and the setting value is aaa@co.jp. Only a character string representing a mail address has been explained concerning the setting value. However, it may be structured data in the XML format. Not the mail address but a telephone number, a FAX number, or an IP address used for IP address FAX may be used. The setting value is appropriately set in accordance with a predetermined setting item.

FIG. 5A shows a state in which 199 destinations from destination 1 to 199 are registered in AddressBook2 that is a group address book of Group1. Additionally, since the data capacity that the multifunction peripheral 120 can save is limited, an upper limit is generally predetermined for the number of data or the data capacity in a list format data such as an address book. In this embodiment, a case in which the upper limit number of group address books that can be registered in the group address book is 200 will be described as an example.

FIG. 5B shows a group address book saved in the HDD 305 of the multifunction peripheral 120a. FIG. 5B shows a state in which after the data of the group address book in the state shown in FIG. 5A is acquired from the setting value management server 110, one destination is added by a user operation. FIG. 5C shows a group address book saved in the HDD 305 of the multifunction peripheral 120b. FIG. 5C shows a state in which after the data of the group address book in the state shown in FIG. 5A is acquired from the setting value management server 110, one destination is added by a user operation.

Figure 6B:
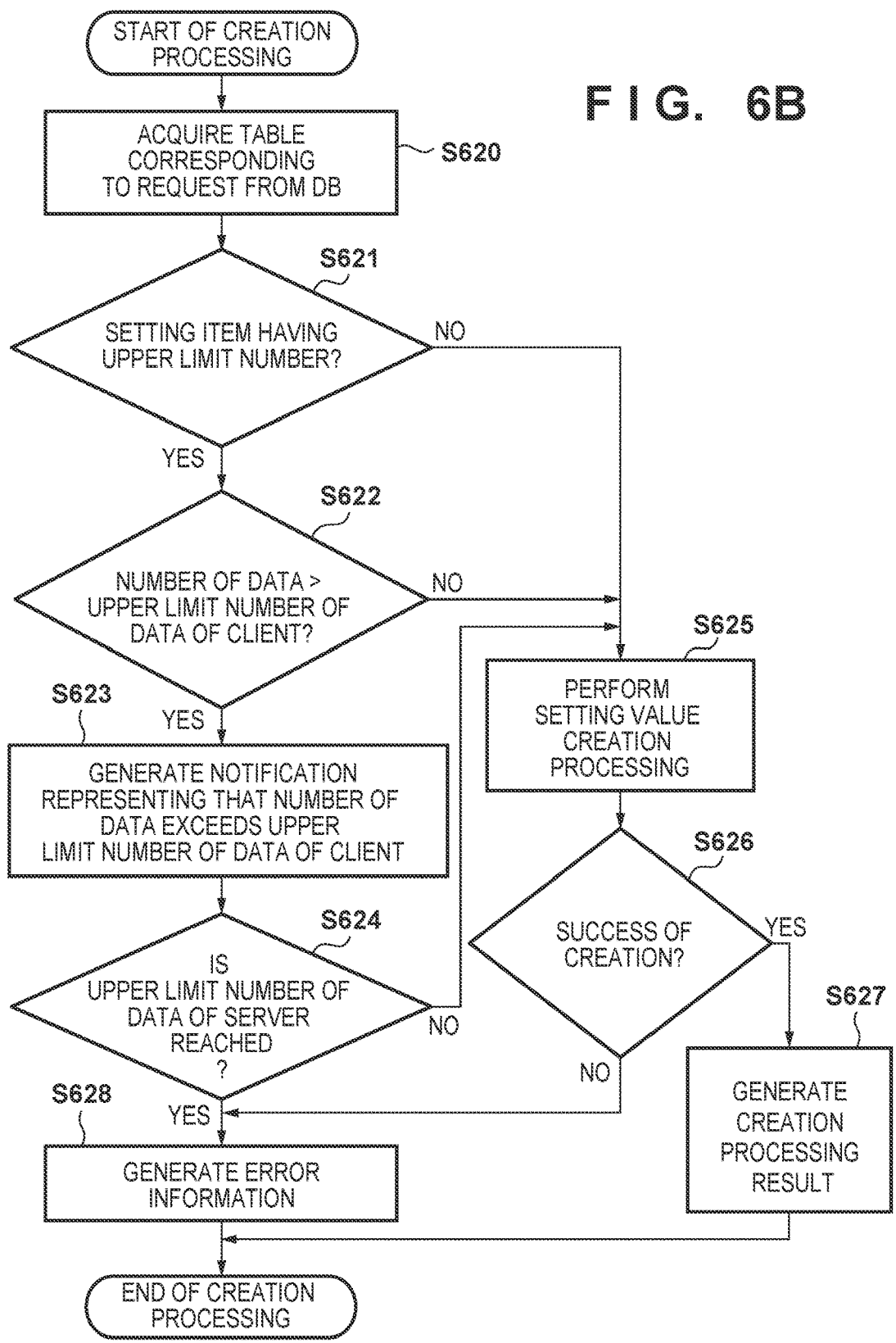
Figure 6C:
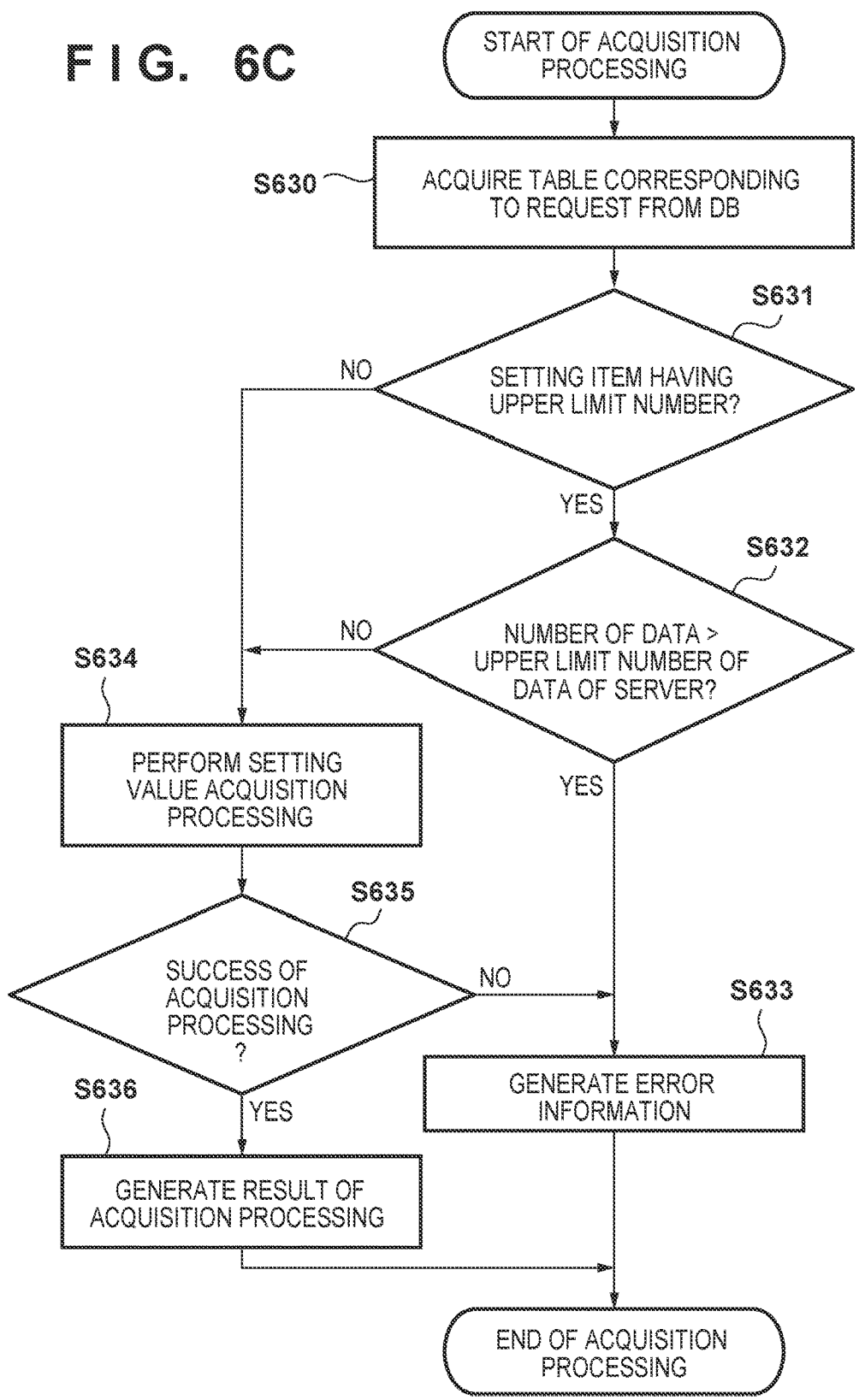

FIGS. 6A to 6C are flowcharts showing processing executed by the CPU 203 in the setting value management server 110 upon receiving each processing request of a setting value from the multifunction peripheral 120. Processing requests include, for example, requests of creation processing, updating processing, acquisition processing, and erase processing. The processes shown in FIGS. 6A to 6C are implemented when, for example, the CPU 203 of the setting value management server 110 loads a program from the HDD 205 and executes it.

FIG. 6A is a flowchart showing processing executed when the setting value management server 110 receives a processing request from the multifunction peripheral 120. In step S601, the transmission/reception unit 401 of the data management server application 400 receives data from the multifunction peripheral 120 received via the communication I/F 207. In step S602, the control unit 402 transfers the data received by the transmission/reception unit 401 to the analysis unit 403, and the analysis unit 403 analyzes the received data. The analysis unit 403 determines based on the analysis result whether the request contents from the multifunction peripheral 120 indicate creation processing, updating processing, acquisition processing, and deletion processing.

In step S603, the control unit 402 determines whether the processing contents analyzed in step S602 indicate creation processing. Upon determining that the processing is creation processing, the process advances to step S604. Upon determining that the processing is not creation processing, the process advances to step S605. In step S604, setting value creation processing is executed. Details of the setting value creation processing will be described later with reference to FIG. 6B.

In step S605, the control unit 402 determines whether the processing is data updating processing. Upon determining that the processing is updating processing, the process advances to step S606. Upon determining that the processing is not updating processing, the process advances to step S607. In step S606, updating processing of the value of data already existing in the data management unit 410 of the setting value management server 110 is executed.

In step S607, the control unit 402 determines whether the processing is acquisition processing. Upon determining that the processing is acquisition processing, the process advances to step S608. Upon determining that the processing is not acquisition processing, the process advances to step S609. In step S609, erase processing of data existing in the data management unit 410 is executed. In the processes of steps S604, S606, S608, and S609, the data processing unit 404 generates a processing result to be returned to the client (multifunction peripheral 120). In step S610, the transmission/reception unit 401 transmits the processing result to the client, and ends the data reception processing of FIG. 6A.

Details of creation processing of step S604 in FIG. 6A will be described with reference to FIG. 6B. Processing shown in FIG. 6B is, for example, processing of registering a new address in an address book. In step S620, the analysis unit 403 specifies the type of data for which the creation processing is requested, based on the data received from the multifunction peripheral 120. For example, the analysis unit 403 specifies that the data for which the creation processing is requested is the destination table of a group address book. The control unit 402 then acquires data corresponding to the specified data type from the data management unit 410. In step S621, the control unit 402 determines based on the specified data type whether the setting item has an upper limit number.

In the example of the destination table, a setting item having an upper limit number is, for example, a destination table having a plurality of data of users or groups. Upon determining in step S621 that the setting item has an upper limit number, the process advances to step S622. Upon determining that the setting item does not have an upper limit number, the process advances to step S625.

In step S622, the data processing unit 404 determines whether the number of data exceeds the upper limit number of data held by the multifunction peripheral 120. The upper limit number of data held by the multifunction peripheral 120 is the upper limit number of data that can be registered in the multifunction peripheral 120 on a data type basis. For example, as for the number of destinations of a group address book, the upper limit number of data that can be held by the multifunction peripheral 120 is 200. Upon determining in step S622 that the number of data exceeds the upper limit number of data of the multifunction peripheral 120, in step S623, the control unit 402 generates notification information representing that the number of data exceeds the upper limit number of data held by the multifunction peripheral 120.

Upon determining in step S622 that the number of data does not exceed the upper limit number of data held by the multifunction peripheral 120 (the number of data is equal to or smaller than the upper limit), the process advances to step S625. In step S624, it is determined whether the number of data exceeds the upper limit number of data held by the setting value management server 110. Upon determining that the number of data exceeds the upper limit number of data, the process advances to step S628. Upon determining that the number of data does not exceed the upper limit number of data, the process advances to step S625. In this embodiment, the upper limit number of data held by the setting value management server 110 is larger than the upper limit number of data held by the multifunction peripheral 120. If the number of data registrable in the group address book held by the multifunction peripheral 120 is 200, the upper limit number of data registrable in the setting value management server 110 is, for example, 250.

In step S625, the control unit 402 reflects the data received from the multifunction peripheral 120 on the group information database (DB) of master data in the data management unit 410. In step S626, the control unit 402 determines whether creation processing has succeeded. Upon determining that the creation processing has failed, the process advances to step S628. Upon determining that the creation processing has succeeded, the process advances to step S627. In step S627, the control unit 402 generates information representing that creation of the setting value to be transmitted to the multifunction peripheral 120 has succeeded, and ends the creation processing of FIG. 6B.

In step S628, the control unit 402 generates error information (error notification). There are two types of error information. One is error information concerning the operation on the serve (setting value management server 110) side, and the other is error information as the processing result to be returned to the client (multifunction peripheral 120). The former error information concerning the operation on the server side is information that needs to be notified to the server administrator as error information when the server administrator accesses the management screen of the setting value management server 110 (to be described later). The latter error information as the processing result to be returned to the client is the information of a processing result including a status code representing that the creation processing has failed as the response to be returned to the client.

In the procedure described with reference to FIG. 6B, the number of destinations of the group address book registrable in the setting value management server 110 is 250. Hence, the process advances to the setting value creation processing of step S625 until the number reaches 250. By the processing of step S625, the data transmitted from the multifunction peripheral 120 can be reflected on the setting value management server 110. For this reason, the processing normally ends as the processing in the multifunction peripheral 120. That is, in this embodiment, even if the number of data exceeds the upper limit number of data held by the multifunction peripheral 120, that is, 200, the data creation processing on the server side succeeds before the number of data reaches 250.

If the upper limit number of data held by the setting value management server 110 equals the upper limit number of data held by the multifunction peripheral 120, an error is returned to the multifunction peripheral 120 at the point of time when the number of data exceeds 200. The data transmitted from the multifunction peripheral 120 is not reflected on the master data in the setting value management server 110.

For example, assume that the setting values in the data management unit 410 of the setting value management server 110 change to the state shown in FIG. 5A, and after that, the multifunction peripherals 120a and 120b simultaneously update the values. In this case, the 200th address book is registered in each of the HDDs 305 of the multifunction peripherals 120a and 120b, as shown in FIGS. 5B and 5C. After that, when the setting value management server 110 is requested to create the 200th data, data first received by the server is reflected because the data is the 200th data in the setting value management server 110 as well. On the other hand, since the number of data reaches the upper limit number with data received by the setting value management server 110 later, the data cannot be reflected, the processing results in an error, and the error is returned the multifunction peripheral 120. For this reason, the 200th data created by one multifunction peripheral 120 cannot be reflected on the setting value management server 110.

On the other hand, in this embodiment, the upper limit number of data held by the setting value management server 110 is larger than the upper limit number of data held by the multifunction peripheral 120. Hence, even if the amount of information (the number of data) held by the setting value management server 110 becomes larger than the upper limit number of data held by the multifunction peripheral 120, the data can temporarily be reflected on the setting value management server 110. As a result, the administrator of the setting value management server 110 can refer to the data saved in the data management unit 410 later and flexibly determine whether to delete newly registered data or delete other unnecessary data.

FIG. 6C is a flowchart showing details of the acquisition processing of step S608 in FIG. 6A. Processing shown in FIG. 6C is, for example, processing of acquiring an address updated after a predetermined time. In step S630, the analysis unit 403 specifies the type of data for which the acquisition processing is requested, based on the data received from the multifunction peripheral 120. For example, the analysis unit 403 specifies that the data for which the acquisition processing is requested is the destination table of a group address book. The control unit 402 then acquires data corresponding to the specified data type from the data management unit 410.

In step S631, the control unit 402 determines based on the specified data type whether the setting item has an upper limit number. A setting item having an upper limit number is, for example, a destination table having a plurality of data of users or groups. Upon determining in step S631 that the setting item has an upper limit number, the process advances to step S632. Upon determining that the setting item does not have an upper limit number, the process advances to step S634.

In step S632, the data processing unit 404 determines whether the number of data exceeds the upper limit number of data held by the setting value management server 110. Upon determining that the number of data exceeds the upper limit number of data held by the setting value management server 110, in step S633, the control unit 402 generates error information. This error information is the same as that described concerning step S628. After step S633, the processing of FIG. 6C ends. When the multifunction peripheral 120 acquires data from the setting value management server 110, an operation of registering the data in the setting value management server 110 may be performed after adding and updating. In this embodiment, in a case of an acquisition request, the multifunction peripheral 120 can be given a warning by the error information in step S633.

In step S634, the data processing unit 404 acquires a corresponding setting value from the data management unit 410. In step S635, the control unit 402 determines whether acquisition processing has succeeded. Upon determining that the acquisition processing has succeeded, the process advances to step S636 to generate an acquisition processing result to be transmitted to the multifunction peripheral 120. After that, the processing of FIG. 6C ends.

Figure 7A:
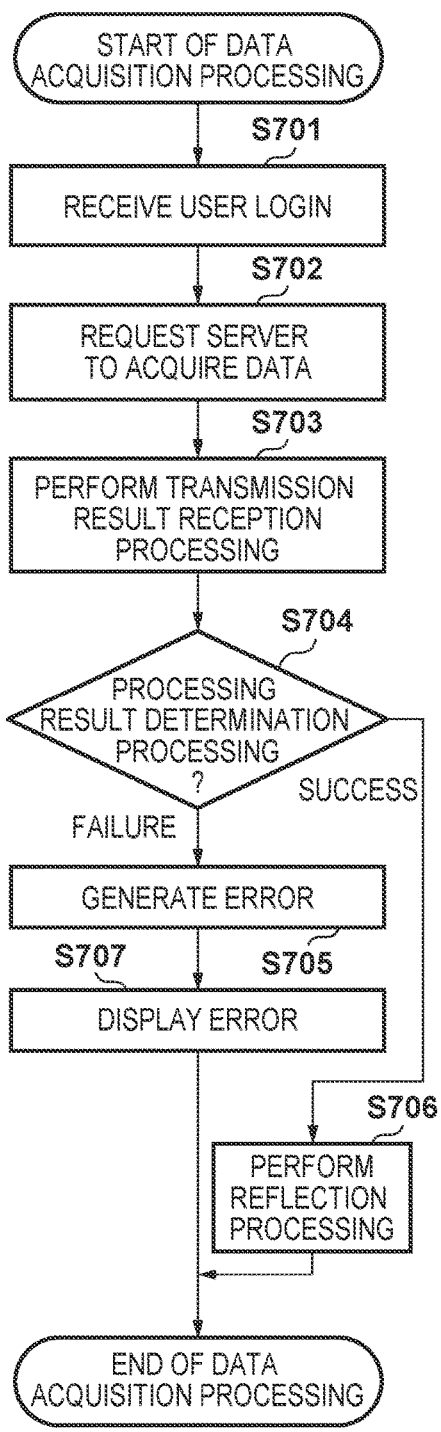
FIGS. 7A and 7B are flowcharts showing processing in the multifunction peripheral at the time of data acquisition and data creation.
Figure 7B:
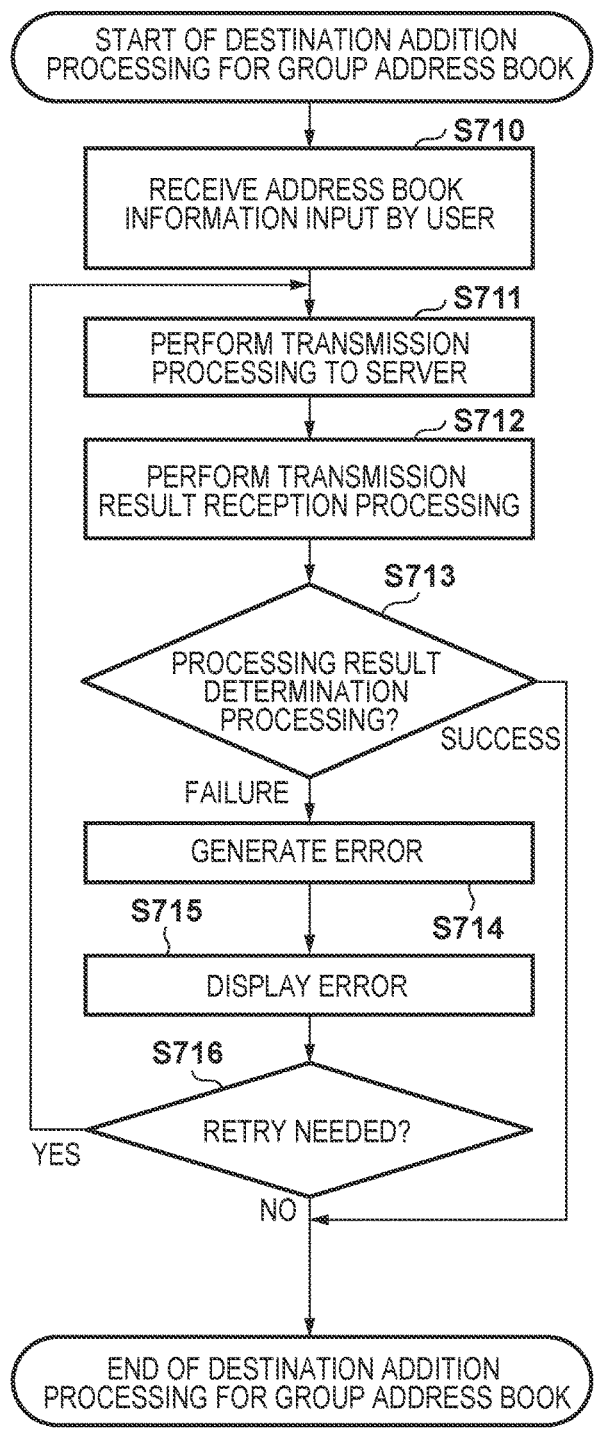

FIGS. 7A and 7B are flowcharts showing processes executed by the CPU 302 in the multifunction peripheral 120 at the time of a setting value acquisition request and a setting value reflection request. The processes shown in FIGS. 7A and 7B are implemented when, for example, the CPU 302 of the multifunction peripheral 120 loads a program from the HDD 305 and executes it.

FIG. 7A is a flowchart showing data acquisition processing executed by the multifunction peripheral 120. In step S701, the CPU 302 receives a user login event from the operation unit 320. In step S702, the CPU 302 specifies a group to which the user belongs based on the login user information, and transmits, to the setting value management server 110, a data acquisition request to the setting value management server 110. In step S703, the CPU 302 receives a transmission result from the setting value management server 110. The transmission result includes information representing whether the data acquisition requested of the setting value management server 110 has succeeded, and if the information represents success, information acquired from the data management unit 410 of the setting value management server 110.

In step S704, the CPU 302 confirms the processing result in the setting value management server 110, which is included in the transmission result, and branches the processing depending on the processing result. At the time of communication using HTTP (Hypertext Transfer Protocol), a status code defined by the HTTP may be used as the processing result. For example, if the data acquisition has succeeded, status code 200 representing OK is set. Hence, the processing is branched depending on whether the status code is 200.

Upon determining in step S704 that the data acquisition has succeeded, the process advances to step S706, and the CPU 302 reflects the acquired data on the multifunction peripheral 120. Upon determining in step S704 that the data acquisition has failed, the process advances to step S705, and the CPU 302 records the failure of the processing in a log that records the communication result of the multifunction peripheral 120. If it is necessary to notify the user, the CPU 302 generates error information. In step S707, the CPU 302 displays the error information generated in step S705 on the operation unit 320 of the multifunction peripheral 120.

FIG. 7B is a flowchart showing data creation processing executed by the multifunction peripheral 120 when, for example, the user adds destination information of the group address book. In step S710, the CPU 302 receives address book information that the user inputs from the operation unit 320. In step S711, the CPU 302 transmits the received address book information to the setting value management server 110. In step S712, the CPU 302 receives a transmission result from the setting value management server 110. The transmission result includes information representing whether the data generation requested of the server has succeeded. If a problem arises in the generation processing, the transmission result includes a processing result according to the contents of the problem.

In step S713, the CPU 302 determines, based on the processing result included in the transmission result received in step S712, whether the creation processing has succeeded. Upon determining that the creation processing has succeeded, the destination addition processing for the group address book ends. Upon determining that the creation processing has failed, the process advances to step S714. In step S714, error information is generated based on the acquired processing result. The data creation processing fails when, for example, the server is not activated, or when data cannot reach the server because of a problem in the network or cable halfway through. An error also occurs when the number of destinations of the destination table of the group address book transmitted reaches the upper limit number of data in the setting value management server 110. In step S715, the CPU 302 displays the generated error information on the operation unit 320 of the multifunction peripheral 120. In step S716, if retry processing needs to be executed a predetermined number of times according to a predetermined rule, the process returns to step S711 to execute data transmission to the setting value management server 110 again.

A processing procedure executed in the setting value management server 110 until the server administrator who manages the setting value management server 110 detects an error state and solves it will be described with reference to FIG. 8.

FIG. 8 is a block diagram of a server management application program that operates on the setting value management server 110 and implements a server management function. A server management application program 800 is a web application program that is configured to allow the server administrator to access the management screen via the network 100 and operates on the setting value management server 110.

A server management screen 810 is a management screen used by the server administrator to manage the setting value management server 110. The server management screen 810 performs display control to display a user interface screen (UI: operation screen) that enables management of setting values saved in the data management unit 410. A transmission/reception unit 801 receives access from the server administrator, receives operation contents or the like from the server management screen 810, and transmits the result of processing of the server management application program 800 to the server management screen 810. A control unit 802 transfers the contents received by the transmission/reception unit 801 to an analysis unit 803, and based on an analysis result received from the analysis unit 803, requests a data processing unit 804 to do processing. The data processing unit 804 executes data acquisition from the data management unit 410 or deletion request to the data management unit 410, and based on the processing result, generates display contents to be displayed on the server management screen 810.

The server management screen 810 can be a screen displayed on any device out of the setting value management server 110, the multifunction peripheral 120, the PC 130, and the mobile terminal 140 connected to the network 100.

Figure 9A:
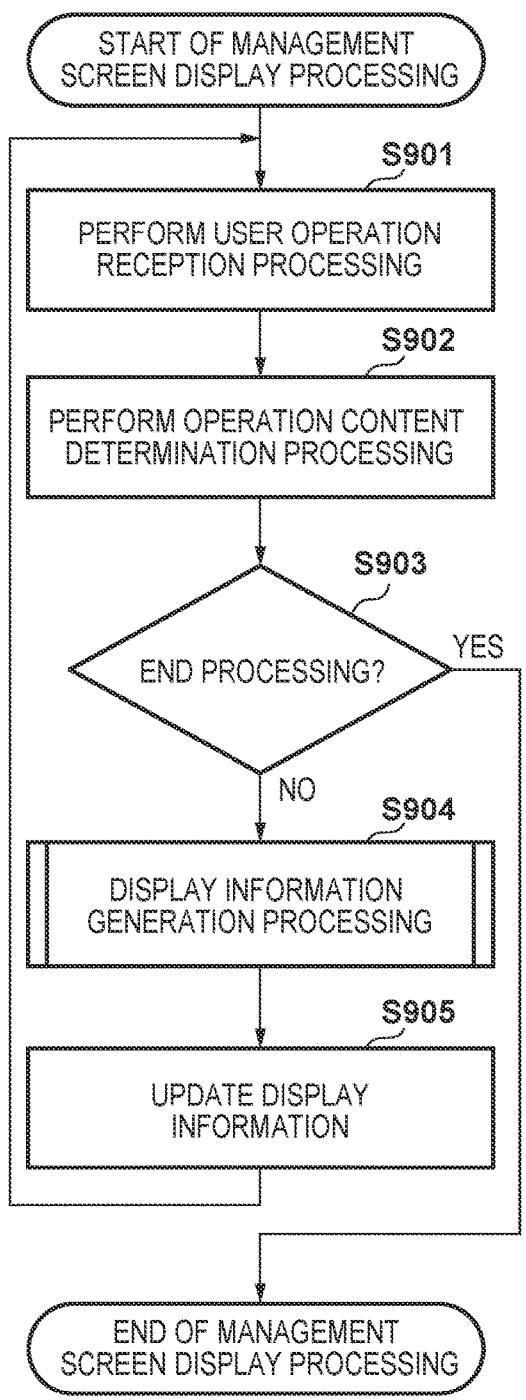
FIGS. 9A and 9B are flowcharts showing display processing to a management screen.
Figure 9B:
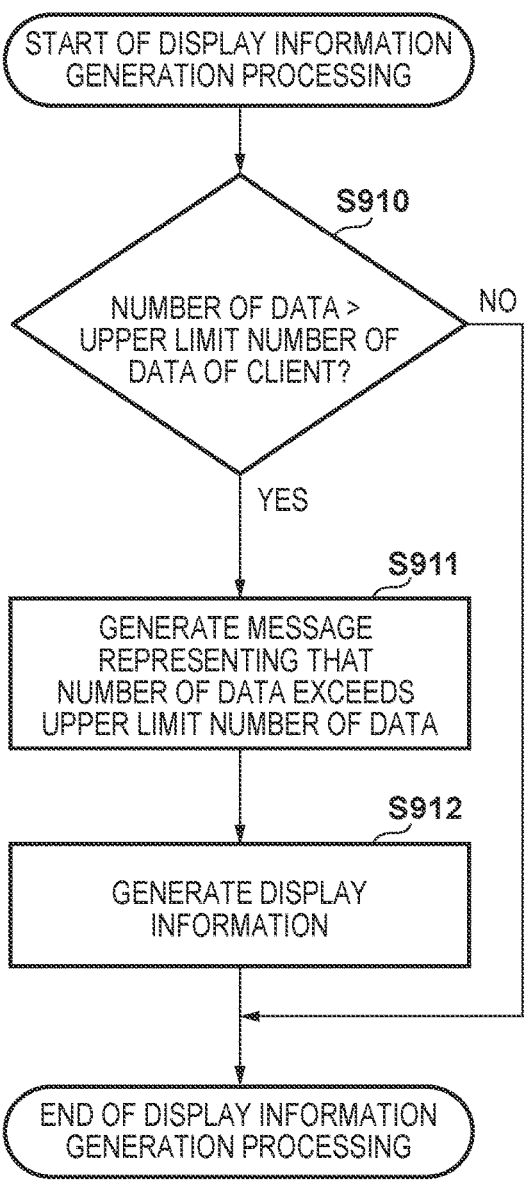

FIG. 9A is a flowchart showing processing executed in the server management application program 800 when the server administrator accesses the management screen 810. The processes shown in FIGS. 9A and 9B are implemented when, for example, the CPU 203 of the setting value management server 110 loads a program from the HDD 205 and executes it.

In step S901, the transmission/reception unit 801 of the server management application program 800 receives data representing connection to the server management application program 800 from the PC 130 or the mobile terminal 140 such as a smartphone or a tablet terminal.

In step S902, the control unit 802 transfers the received data to the analysis unit 803, and the analysis unit 803 specifies the user operation contents and display data according to the contents. For example, if the specified user operation is activation of the management screen, all data managed by the data management unit 410 are specified as data to be displayed. If the user operation is a group address book display instruction from the administrator, group address book data is specified as data to be displayed.

In step S903, the control unit 802 determines whether the user operation is end processing. Upon determining that the user operation is end processing, the management screen display processing of FIG. 9A ends. Upon determining in step S903 that the user operation is not end processing (processing other than end processing), the process advances to step S904.

In step S904, the control unit 802 generates display information for the UI based on the user operation contents. The procedure of step S904 will be described later in detail with reference to FIG. 9B. In step S905, to update the UI display on the management screen 810 based on the display information generated in step S904, the control unit 802 transmits the display information from the transmission/reception unit 801 to the web browser, updates the management screen 810, and waits for reception of an administrator operation again.

The processing of step S904 will be explained with reference to FIG. 9B. In step S910, the control unit 802 determines whether the number of data according to the user operation specified in step S902 exceeds the upper limit number of data held by the client. Upon determining in step S910 that the number of data exceeds the upper limit number of data in the client, in step S911, the control unit 802 generates error information representing that the number of data exceeds the upper limit number of data in the client. In step S912, the control unit 802 generates a management screen including the contents (setting values and the like) designated by the user operation and, if the error information is generated in step S911, the error information, and ends the display information generation processing of FIG. 9B.

Figure 10:
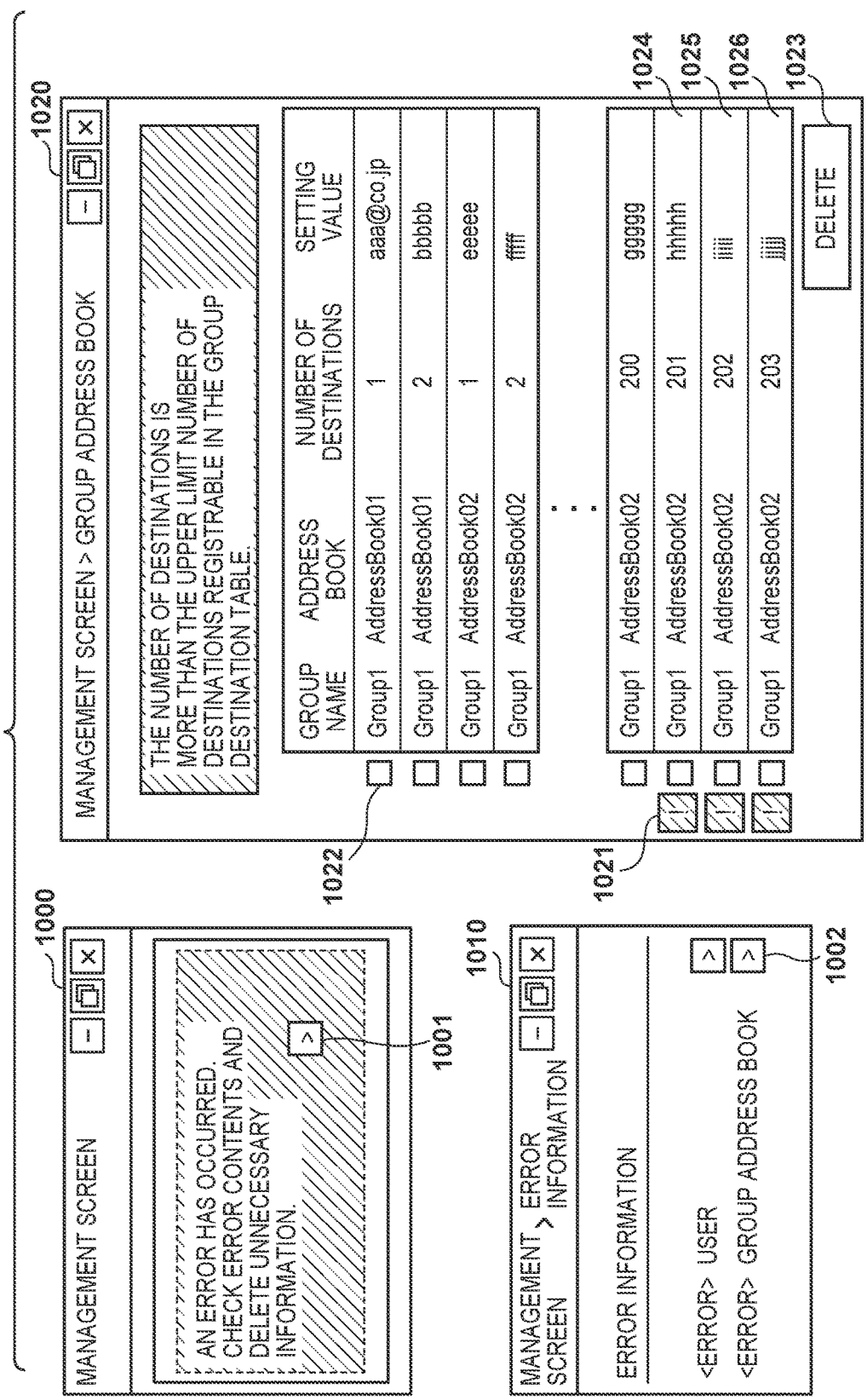
FIG. 10 is a view showing the management screen.

FIG. 10 is a view showing an example of the management screen 810 generated in accordance with the procedures shown in FIGS. 9A and 9B. A screen 1000 is an example of a screen displayed in a case in which the number of data exceeds the upper limit number of data held by the client when the server administrator accesses the management screen 810. The error display may be done not only in the case in which the number of data exceeds the upper limit number of data held by the client but also for another error.

When the server administrator presses a button 1001 to display the error contents on the screen 1000, the screen changes to a screen 1010. The screen 1010 is an error information display screen. The error information is displayed for each setting value category. When a button 1002 is clicked, the screen changes to a screen 1020 for each category. The screen 1020 is a data selection screen for a group address book. An icon 1021 is an icon representing that an error has occurred. The server administrator can perform data deletion processing by selecting a check box 1022 and pressing a deletion button 1023. The server administrator can also select whether to decrease the number of data by deleting data 1024, 1025, and 1026 that make the number of data exceed the upper limit number of data in the client or to make new data usable by deleting another old data.

As described above, in this embodiment, as the upper limit number of data in the setting value management server 110, a value larger than the upper limit number of data in the multifunction peripheral 120 is used. That is, the upper limit of the amount of setting information held by the server concerning a predetermined setting item used by a device is larger than the upper limit of the amount of information held by the device. As a result, the setting value management server 110 can temporarily hold an information amount more than the upper limit number of setting values held by the device. In addition, the data management unit 410 of the setting value management server 110 can hold data even if the number of data exceeds the upper limit number of data held by the multifunction peripheral 120. This allows the server administrator to select data to be used and data to be deleted later.

In this embodiment, a case in which the upper limit number of destinations for one destination table of a group address book is set as the upper limit has been described. However, the embodiment is applicable to any address book other than the group address book. For example, the embodiment is also applicable to a user address book used by an individual user. The embodiment is also applicable to the user list of the multifunction peripheral 120. For data whose size is not fixed, such as a background image upon login or the information of a custom menu for each user, not the number of data but the size of data may be used as the upper limit. The setting value management server 110 has been explained as a general server such as a PC or cloud. However, the setting value management server 110 may be not the PC or cloud but a server that is incorporated in the device and operates on the multifunction peripheral 120.

Second Embodiment

Regarding the second embodiment, points different from the first embodiment will be described. In this embodiment, an arrangement that changes, in a setting value management server 110, a response to be returned to a multifunction peripheral 120 in a case in which the number of data exceeds the upper limit number of data held by the multifunction peripheral 120 will be described with reference to FIGS. 11A, 11B, 12A, and 12B. According to this embodiment, it is possible to detect that the number of data exceeds the upper limit number of data in the client even on the side of the multifunction peripheral 120.

The processes shown in FIGS. 11A and 11B are implemented when, for example, a CPU 203 of the setting value management server 110 loads a program from an HDD 205 or a ROM 206 and executes it. The processes shown in FIGS. 12A and 12B are implemented when, for example, a CPU 302 of the multifunction peripheral 120 loads a program from an HDD 305 or a ROM 306 and executes it.

FIG. 11A is a flowchart showing processing executed by the CPU 203 in the setting value management server 110 in a case in which the setting value management server 110 receives a setting value acquisition request from the multifunction peripheral 120 and in a case in which the setting value management server 110 receives a setting reflection request. The processes of steps S1101 to S1103 correspond to the processes of steps S601 to S603 in FIG. 6, and the processes of steps S1105 to S1110 are the same as the processes of steps S605 to S610 in FIG. 6. Hence, a description of these processes will be omitted. The process of step S1104 that is different from FIG. 6 will be described with reference to FIG. 11B. FIG. 11B is a flowchart showing creation processing of step S1104 in FIG. 11A.

In step S1120, an analysis unit 403 specifies the type of data for which creation processing is requested, based on data received from the multifunction peripheral 120. For example, the analysis unit 403 specifies that the data for which the creation processing is requested is the destination table of a group address book. A control unit 402 then acquires data corresponding to the specified data type from a data management unit 410. In step S1121, the control unit 402 determines based on the specified data type whether the setting item has an upper limit number.

A setting item having an upper limit number is, for example, a destination table having a plurality of data of users or groups. Upon determining in step S1121 that the setting item has an upper limit number, the process advances to step S1122. Upon determining that the setting item does not have an upper limit number, the process advances to step S1125.

In step S1122, a data processing unit 404 determines whether the number of data exceeds the upper limit number of data held by the multifunction peripheral 120. The upper limit number of data held by the multifunction peripheral 120 is the upper limit number of data that can be registered in the multifunction peripheral 120 on a data type basis. For example, as for the number of destinations of a group address book, the upper limit number of data that can be held by the multifunction peripheral 120 is 200. Upon determining in step S1122 that the number of data exceeds the upper limit number of data of the multifunction peripheral 120, in step S1123, the control unit 402 determines whether the number of data exceeds the upper limit number of data held by the setting value management server 110. Upon determining in step S1122 that the number of data does not exceed the upper limit number of data of the multifunction peripheral 120, the process advances to step S1125.

Upon determining in step S1123 that the number of data does not exceed the upper limit number of data held by the setting value management server 110, the process advances to step S1124. Upon determining that the number of data exceeds the upper limit number of data, the process advances to step S1127. In step S1124, the control unit 402 generates notification information representing that the number of data exceeds the upper limit number of data held by the client. There are two types of notification information. One is information to be returned to the client as a processing result, and the other is information used to display, on a management screen 810, that the number of data exceeds the upper limit number of data held by the client. The information to be returned to the client as a processing result includes a warning representing that the state is not normal or information representing that the status is an error status.

In step S1125, the control unit 402 reflects the data received from the multifunction peripheral 120 on the data management unit 410. In step S1126, the control unit 402 determines whether the processing of step S1125 has succeeded. Upon determining that the processing has succeeded, in step S1128, a processing result is generated in consideration of the notification information in step S1124. Upon determining in step S1126 that the creation has failed, the process advances to step S1127. In step S1127, the control unit 402 generates error information to be returned to the client.

As described above, even when the number of data exceeds 200, that is the upper limit number of data held by the multifunction peripheral 120, data can be reflected on the data management unit 410 of the setting value management server 110. In this embodiment, when requesting creation processing, the value to be returned to the client is set to not normal but warning or error. As a result, it is possible to detect that the number of data exceeds the upper limit number of data held by the multifunction peripheral 120 on the client side.

Processing in the multifunction peripheral 120 in a case in which information representing that the number of data exceeds the upper limit number of data held by the multifunction peripheral 120 is returned from the setting value management server 110 by the processing shown in FIGS. 11A and 11B will be described next with reference to FIGS. 12A and 12B. The processes of steps S1201 to S1207 in FIG. 12A are the same as the processes of steps S701 to S707 in FIG. 7A, and a description thereof will be omitted. Regarding FIG. 12B, points different from FIG. 7B will be described.

In step S1213 of FIG. 12B, the CPU 302 determines the processing result of processing requested of the setting value management server 110. In step S713 of FIG. 7A according to the first embodiment, the processing result on the server side is returned as a failure when the number of data exceeds the upper limit number of data held by the setting value management server 110. On the other hand, in this embodiment, notification information representing that the number of data exceeds the upper limit number of data in the client is generated in step S1124. Hence, in step S1213, it is determined whether the processing result indicates a success or failure, based on whether the notification information is received. Upon determining in step S1213 that the processing has succeeded, the destination addition processing for a group address book in FIG. 12B ends. Upon determining that the processing has failed, the process advances to step S1214 to generate error information.

In step S1215, the CPU 302 determines whether the user who added the address book is presently logging in to the multifunction peripheral 120. Upon determining that the user is logging in, the process advances to step S1216, and the CPU 302 displays the generated error information on an operation unit 320 of the multifunction peripheral 120. Upon determining that the user is not logging in, the process advances to step S1217 without performing error display. In step S1217, the CPU 302 executes retry processing according to a predetermined rule in the multifunction peripheral 120. For example, a setting may be done in advance to execute retry processing if there is a possibility of recovery in a state in which communication with the setting value management server 110 is impossible.

Figure 13:
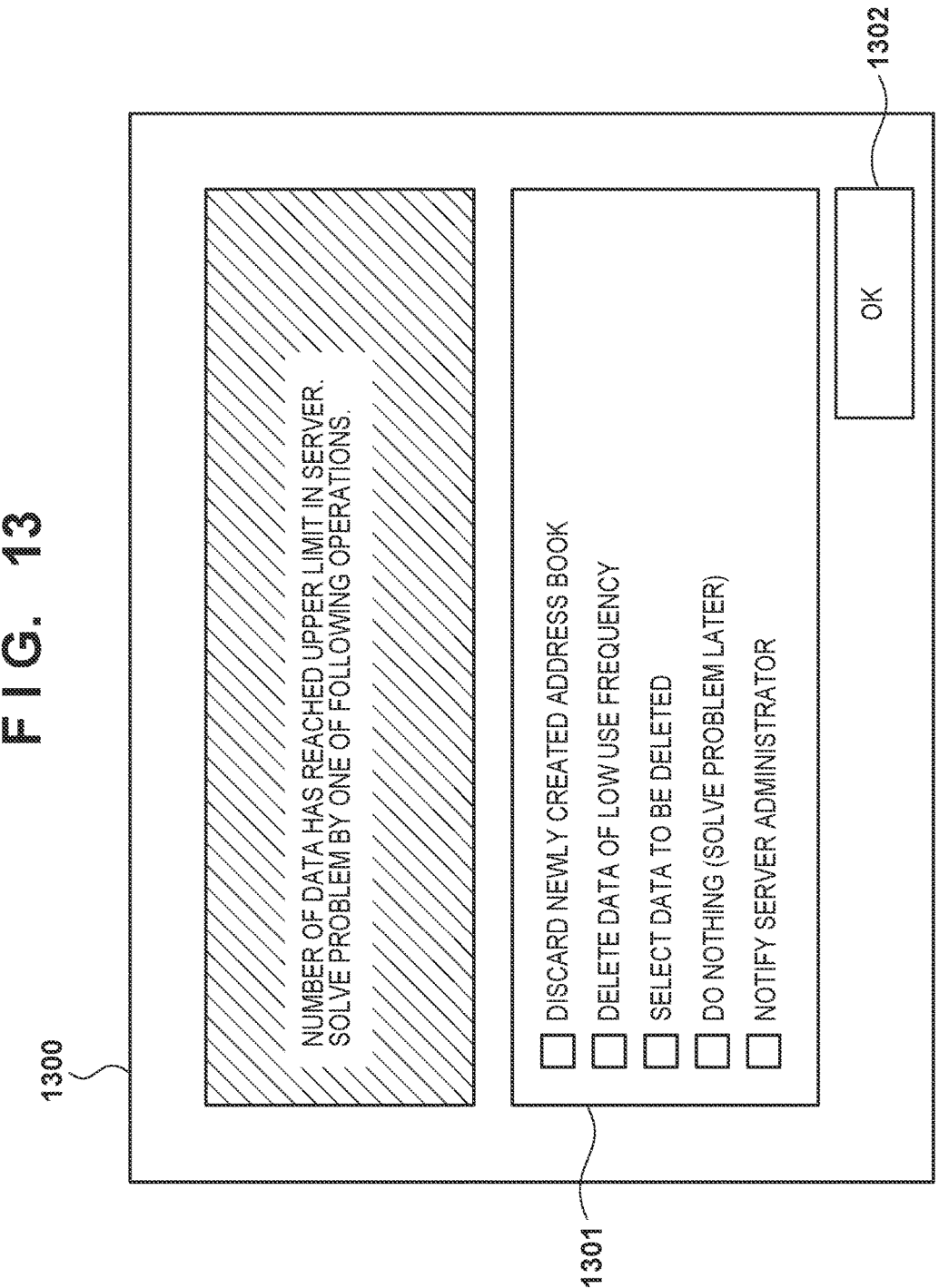
FIG. 13 is a view showing an error screen displayed on an operation unit.

FIG. 13 shows an example of a UI displayed on the operation unit 320. An error screen 1300 is an example of a UI displayed on the operation unit 320. A message representing that the number of data has reached the upper limit number of data held by the server is displayed on the upper portion of the error screen 1300. A plurality of candidates 1301 are displayed on the lower portion so as to allow the user to select an operation to be performed. The user selects one of the plurality of candidates and presses an OK button 1302, thereby instructing execution of the selected processing.

FIG. 13 shows an item "discard newly created address book" as a method of deleting an address book created by the user this time. There are also shown items "delete data of low use frequency" and "select data to be deleted" as methods of deleting data that is not an address added this time. If "delete data of low use frequency" is selected, deletion is executed for the data in ascending order of use frequency except the newly added destination. If "select data to be deleted" is selected, the corresponding destination table is displayed, and an UI that allows the user to select a destination to be deleted is displayed separately. If "do nothing (solve problem later)" is selected, the error screen 1300 is ended without performing any processing. If "notify server administrator" is selected, a notification to the server administrator is executed by mail transmission or the like.

Note that the UI shown in FIG. 13 is merely an example and is not limited to this. A case in which the display is done on the UI of the operation unit 320 has been described. However, the display may be done on the management screen or the like at the time of access to the multifunction peripheral 120 via a web browser.

As described above, even if the number of data in the setting value management server 110 exceeds the upper limit number of data held by the multifunction peripheral 120, data can be saved in the data management unit 410 until the number of data reaches the upper limit number of data in the setting value management server 110. If the number of data exceeds the upper limit number of data held by the multifunction peripheral 120, a warning notification representing that the state is not normal is returned as a response to the data creation request from the multifunction peripheral 120. In addition, the user who uses the multifunction peripheral can recover the error state by deleting, on the operable UI, at least some of data on the server.

Third Embodiment

In the first and second embodiments, an arrangement that uses a fixed value as the upper limit number of data held by the server in the setting value management server 110 has been described. In this embodiment, an arrangement that dynamically changes the upper limit number of data held by the server will be described. Points different from the first and second embodiments will be described below.

A case in which the upper limit number of data held by a server in a setting value management server 110 is changed in accordance with the number of connected clients will be explained here. In this embodiment, a plurality of multifunction peripherals 120 are connected to the setting value management server 110, and various kinds of setting information are synchronized. The larger the number of multifunction peripherals connected to the setting value management server 110 is, the higher the possibility that the upper limit numbers of data held by the multifunction peripherals 120 in the server are different is. For this reason, the upper limit number of data held by the server in the setting value management server 110 is set to be larger as the number of connected multifunction peripherals increases. For example, the margin to the upper limit number of data held by the multifunction peripheral 120 is set to 5 per connected device. In this case, first, the margin to the upper limit number of data held by the server is calculated by margin to upper limit number of data held by server=margin(5) to upper limit number of data held by multifunction peripheral 120 per connected device×number $N$ of connected devices (1)

The sum of calculated results is set to the upper limit number of data held by the server.

For example, if the number of connected devices is 3, the margin to the upper limit number of data held by server is 5×3=15. Hence, 200+15=215 is the upper limit number of data held by the server.

According to equation (1), even if the number of connected multifunction peripherals 120 increases, the number of data never exceeds the upper limit number of data held by the server in the setting value management server 110, and the upper limit number can efficiently be set.

An arrangement that sets the upper limit number of data held by the server in the setting value management server 110 in accordance with a data type will be described next. As data held by the setting value management server 110, data that is simultaneously accessed by a plurality of persons at a high possibility and data that is simultaneously accessed by a plurality of persons at a low possibility exist. For example, a personal address book that can be set for each user is data that is simultaneously changed from a plurality of devices at a low possibility. An address book such as a group address book shared by users in a group is considered as data that is simultaneously changed from the plurality of multifunction peripherals 120 at a high possibility.

For this reason, for data such as a group address book that is changed from a plurality of users at a high possibility, for example, the margin to the upper limit number of data held by the multifunction peripheral 120 is set to 50. For data such as a personal address book that is simultaneously changed at a low possibility, for example, the margin to the upper limit number of data held by the multifunction peripheral 120 can be set to 25. That is, the margin for data that is simultaneously accessed at a high possibility is set to be larger than the margin for data that is simultaneously accessed at a low possibility.

If the server has a sufficient storage capacity, the upper limit number of data held by the server may be set to "upper limit number of data held by multifunction peripheral 120× number of connected multifunction peripherals 120". For example, 200×3=600 may be set to the upper limit number of data held by the server. That is, the upper limit of the setting information amount that can be held by the server is decided in accordance with the number of devices connected to the server. This makes it possible to ensure the capacity reflectable on the setting value management server 110 in response to the data creation request from the multifunction peripheral 120.

Fourth Embodiment

In the first and second embodiments, an arrangement that uses a fixed value as the upper limit number of data held by the server in the setting value management server 110 has been described. In this embodiment, an arrangement that dynamically changes the upper limit number of data held by the server will be described. Points different from the first and second embodiments will be described below.

Figure 14:
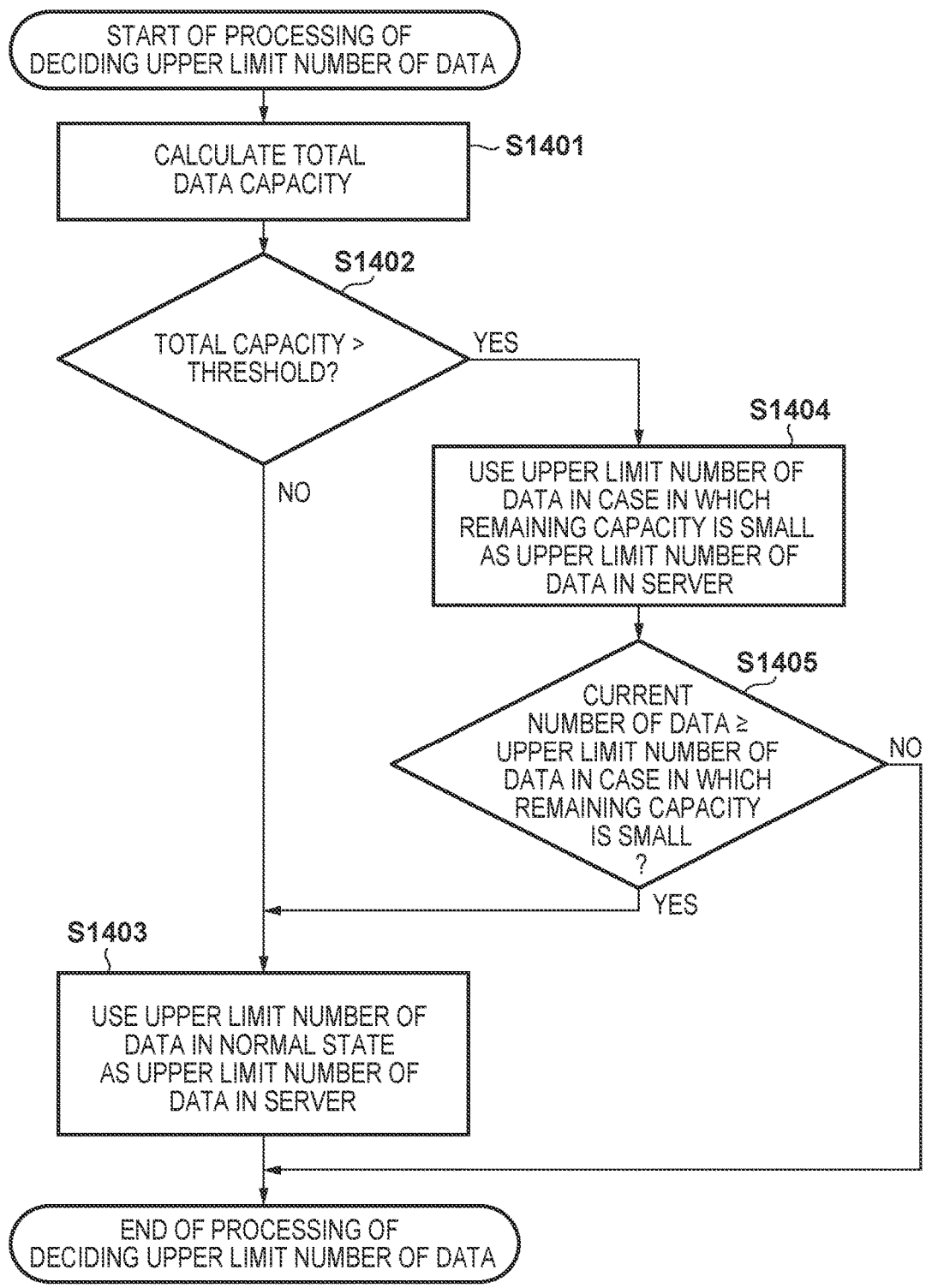
FIG. 14 is a flowchart showing processing of deciding the upper limit number of data in the server.

A case in which the upper limit number of data held by a server in a setting value management server 110 is changed in accordance with another upper limit number of data held by the server in the setting value management server 110 will be explained here with reference to FIG. 14. FIG. 14 is a flowchart showing processing of deciding the upper limit number of data held by the server. The processing of FIG. 14 is executed when determining in steps S624 and S632 of FIG. 6 whether the number of data reaches the upper limit number of data held by the server.

In step S1401, a control unit 402 calculates the total capacity of data saved in the setting value management server 110. In step S1402, the control unit 402 determines whether the total capacity calculated in step S1401 is equal to or smaller than a threshold. The threshold is a threshold for a data size that can be saved in the setting value management server 110. For example, 80% of the size that can be saved in the setting value management server 110 may be set as the threshold. In this case, upon determining that the total capacity exceeds 80% of the size that can be saved in the setting value management server 110, the process advances to step S1404. Upon determining that the total capacity does not exceed, the process advances to step S1403.

In step S1403, the control unit 402 sets a value with a relatively large margin to the upper limit number of data held by the multifunction peripheral 120 as the upper limit number of data held by the server in a normal state. On the other hand, in step S1404, a value with a margin smaller than the value set in step S1403 to the upper limit number of data held by the multifunction peripheral 120 is set as the upper limit number of data held by the server. That is, in this embodiment, if the remaining capacity of the storage unit is small, the upper limit number of data held by the server is adjusted to be smaller in step S1404.

For example, assume that as the upper limit number of destinations registrable in a group address book, the upper limit number of data held by the multifunction peripheral 120 is 200, and the upper limit number of data held by the server is 300. In this case, in step S1404, 250 smaller than 300 is set. Next, in step S1405, the control unit 402 determines whether the number of currently held data reaches the upper limit number of data calculated in step S1404. Upon determining that number of data reaches the upper limit number, the process advances to step S1403 to use the upper limit number of data in the normal state. On the other hand, upon determining that number of data does not reach the upper limit number, the upper limit number of data decided in step S1404 is directly used.

In this embodiment, the upper limit number of data held by the server is set based on the remaining capacity of the storage unit. It is therefore possible to change the upper limit of the information amount of setting values that can be held for a predetermined setting item in accordance with a change in the setting information amount stored in the storage unit for items other than the predetermined setting item. Accordingly, when the remaining capacity of the storage unit decreases, the upper limit number of data held by the server is made smaller than usual, thereby efficiently using the disk capacity of the server.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-176966, filed Sep. 8, 2015, which is hereby incorporated by reference herein in its entirety.

What is claimed is:

1. An information sharing system including a server and a device capable of communicating with the server,
    the device comprising a first processor configured to:
        hold setting information about a predetermined setting item shared by a plurality of devices, and
    the server comprising a second processor configured to:
        hold the setting information about the predetermined setting item;
        determine, when a plurality of devices update contents of the setting information about the predetermined setting item held in the plurality of devices respectively and the server receives the updated contents of the setting information about the predetermined setting item from the plurality of devices, whether to reflect updated contents of the setting information about the predetermined setting item held in at least one of the plurality of devices in the setting information about the predetermined setting item held in the server, using a first upper limit and a second upper limit larger than the first upper limit that are specified on an information amount of the setting information for the predetermined setting item to be held in the server, wherein the first upper limit corresponds to an information amount of the setting information for the predetermined setting item that the device can hold; and
        reflect, when it is determined to reflect the updated contents of the setting information about the predetermined setting item held in at least one of the plurality of devices in the setting information about the predetermined setting item held in the server, the updated contents of the setting information about the predetermined setting item held in at least one of the plurality of devices in the setting information about the predetermined setting item held in the server,
        wherein the second processor determines to reflect the updated contents of the setting information about the predetermined setting item held in at least one of the plurality of devices in the setting information about the predetermined setting item held in the server, unless the information amount of the setting information for the predetermined setting item held in the server exceeds the second upper limit.

2. The system according to claim 1, wherein an upper limit, which corresponds to the second upper limit, of the number of pieces of setting information for the predetermined setting item that the server can hold is larger than an upper limit, which corresponds to the first upper limit, of the number of pieces of setting information for the predetermined setting item that the device can hold.

3. The system according to claim 1, wherein an upper limit which corresponds to the second upper limit, of a storage capacity of the setting information for the predetermined setting item that the server can hold is larger than an upper limit, which corresponds to the first upper limit, of a storage capacity of the setting information for the predetermined setting item that the device can hold.

4. The system according to claim 1, wherein the second processor further configured to notify a warning if the information amount of the setting information for the predetermined setting item held in the server exceeds the first upper limit.

5. The system according to claim 4, wherein the second processor notifies a warning different from the warning if the information amount of the setting information for the predetermined setting item held in the server reaches the second upper limit.

6. The system according to claim 4, wherein the second processor notifies at least one of the server and the device.

7. The system according to claim 1, wherein the second processor further configured to display, on a display unit, an operation screen configured to delete at least part of the setting information about the predetermined setting item held in the server if the information amount of the setting information for the predetermined setting item held in the server exceeds the first upper limit.

8. The system according to claim 7, wherein the display control unit displays the operation screen on the display unit of the device.

9. The system according to claim 1, wherein the second upper limit is decided in accordance with the number of the plurality of devices connected to the server.

10. The system according to claim 1, wherein the second upper limit is decided in accordance with a change in an information amount of setting information about setting items other than the predetermined setting item held in the server.

11. The system according to claim 1, wherein the second upper limit is decided in accordance with a remaining capacity of the server.

12. The system according to claim 11, wherein the second upper limit becomes small as the remaining capacity of the server becomes small.

13. The system according to claim 1, wherein the predetermined setting item includes an address book.

* * * * *